(12) United States Patent
Dhulipalla et al.

(10) Patent No.: US 11,515,914 B2
(45) Date of Patent: Nov. 29, 2022

(54) ACTIVE ANTENNA SYSTEM FOR DISTRIBUTING OVER THE AIR CONTENT

(71) Applicant: AVX Antenna, Inc., San Diego, CA (US)

(72) Inventors: Aravind Dhulipalla, Sunnyvale, CA (US); Sebastian Rowson, San Diego, CA (US)

(73) Assignee: Kyocera AVX Components (San Diego), Inc., San Diego, CA (US)

( * ) Notice: Subject to any disclaimer, the term of this patent is extended or adjusted under 35 U.S.C. 154(b) by 0 days.

(21) Appl. No.: 17/481,558

(22) Filed: Sep. 22, 2021

(65) Prior Publication Data

US 2022/0103216 A1    Mar. 31, 2022

Related U.S. Application Data

(60) Provisional application No. 63/083,172, filed on Sep. 25, 2020.

(51) Int. Cl.
*H04L 5/12* (2006.01)
*H04B 7/06* (2006.01)
*H04B 17/309* (2015.01)

(52) U.S. Cl.
CPC ......... *H04B 7/0608* (2013.01); *H04B 17/309* (2015.01)

(58) Field of Classification Search
CPC .......................... H04B 7/0608; H04B 17/309
USPC ........ 375/262, 261, 260, 259, 219, 295, 316
See application file for complete search history.

(56) References Cited

U.S. PATENT DOCUMENTS

| | | | |
|---|---|---|---|
| 6,765,536 | B2 | 7/2004 | Phillips et al. |
| 6,987,493 | B2 | 1/2006 | Chen |
| 7,068,234 | B2 | 6/2006 | Sievenpiper |
| 7,215,289 | B2 | 5/2007 | Harano |
| 7,830,320 | B2 | 11/2010 | Shamblin |
| 7,911,402 | B2 | 3/2011 | Rowson et al. |
| 8,362,962 | B2 | 1/2013 | Rowson et al. |
| 8,446,318 | B2 | 5/2013 | Ali et al. |
| 8,648,755 | B2 | 2/2014 | Rowson et al. |
| 8,717,241 | B2 | 5/2014 | Shamblin et al. |
| 8,754,817 | B1 | 6/2014 | Kuo |
| 9,065,496 | B2 | 6/2015 | Rowson et al. |
| 9,231,669 | B2 | 1/2016 | Desclos et al. |
| 9,240,634 | B2 | 1/2016 | Rowson et al. |
| 9,425,497 | B2 | 8/2016 | Pajona et al. |

(Continued)

*Primary Examiner* — Zewdu A Kassa
(74) *Attorney, Agent, or Firm* — Dority & Manning, P.A.

(57) ABSTRACT

A method for distributing over the air (OTA) content is provided. The method includes detecting connection of an OTA antenna system capable of receiving an OTA signal including media content at a plurality of channels to a network access point via the removable connection. The method includes communicating a control signal from a network access point to the OTA antenna system via a removable connection to configure a modal antenna of the OTA antenna system in a selected mode of a plurality of antenna modes for a selected channel of the plurality of channels. The method includes receiving a signal associated with media content of the selected channel from the OTA antenna system via the removable connection. The method includes communicating the media content of the selected channel via a network communication link to a client device.

20 Claims, 15 Drawing Sheets

(56) References Cited

U.S. PATENT DOCUMENTS

| | | |
|---|---|---|
| 9,439,151 B2 | 9/2016 | Zhu et al. |
| 9,479,242 B2 | 10/2016 | Desclos et al. |
| 9,590,703 B2 | 3/2017 | Desclos et al. |
| 9,755,305 B2 | 9/2017 | Deslos et al. |
| 9,755,580 B2 | 9/2017 | Desclos et al. |
| 2010/0085921 A1 | 4/2010 | Wu |
| 2013/0176964 A1 | 7/2013 | Pan |
| 2013/0230325 A1 | 9/2013 | Chow |
| 2015/0311969 A1 | 10/2015 | Desclos |
| 2016/0119741 A1 | 4/2016 | Huang |
| 2017/0133764 A1 | 5/2017 | Tinaphong |
| 2017/0215210 A1 | 7/2017 | Lipowski |
| 2018/0131990 A1* | 5/2018 | Desclos ............... H04N 21/631 |
| 2018/0175503 A1 | 6/2018 | Liu |
| 2018/0367791 A1 | 12/2018 | Roe et al. |
| 2021/0297166 A1* | 9/2021 | Basavarajappa ....... H04B 17/16 |

* cited by examiner

600

| Channel<br>Mode | 1 | 2 | 3 | | N |
|---|---|---|---|---|---|
| 1 | 0.2 | 0.4 | 0.7 | | 1 |
| 2 | 0.75 | 1 | 0.5 | . . . | 0.2 |
| ⋮ | | | . . . | | |
| M | 0.5 | 1 | 0.3 | | 0.3 |

FIG. 7

ACTIVE ANTENNA SYSTEM FOR DISTRIBUTING OVER THE AIR CONTENT

PRIORITY CLAIM

The present application claims the benefit of priority of U.S. Provisional App. No. 63/083,172, titled "Active Antenna System for Distributing Over the Air Content," having a filing date of Sep. 25, 2020, which is incorporated by reference herein.

FIELD

The present disclosure relates generally to antenna systems for distributing OTA signals to media devices.

BACKGROUND

Antennas for television reception, otherwise known as over the air (OTA) antennas, are well known and routinely used to receive television broadcast signals. Televisions generally include a built-in tuner or an external tuner (e.g., set top box). The OTA antenna can be connected to the tuner (e.g., built-in or external). In some instances, the OTA antenna can be configured to amplify OTA signals. OTA antennas are useful in rural settings where incoming signals require amplification.

Although cable television services have displaced the need for OTA antennas, consumers are now opting to replace cable television services with more cost-effective internet-based streaming services. However, one perceived disadvantage of internet-based streaming services relates to the inability to watch local programming (e.g., local news) provided by local broadcast stations. Since OTA antennas can receive OTA signals associated with local programming, consumers of internet-based streaming services are opting to invest in OTA antennas.

SUMMARY

Aspects and advantages of embodiments of the present disclosure will be set forth in part in the following description, or may be learned from the description, or may be learned through practice of the embodiments.

One example aspect of the present disclosure is directed to a method for distributing over the air (OTA) content. The method can include detecting connection of an OTA antenna system capable of receiving an OTA signal including media content at a plurality of channels to a network access point via a removable connection. The OTA antenna system can include a modal antenna configurable in a plurality of antenna modes, where each antenna mode is associated with a distinct radiation pattern. The method can include communicating a control signal from the network access point to the OTA antenna system via the removable connection to configure the modal antenna in a selected mode of the plurality of antenna modes for a selected channel of the plurality of channels, where the selected mode is determined based at least in part on the selected channel. The method can include receiving a signal associated with media content of the selected channel from the OTA antenna system via the removable connection. The method can include communicating the media content of the selected channel via a network communication link to a client device.

Another example aspect of the present disclosure is directed to a method for distributing over the air (OTA) content over a network. The method can include receiving, at a network access point, a media signal associated with media content from an OTA antenna system via a removable connection. The OTA antenna system can be capable of being tuned to a plurality of channels. The OTA antenna system can include a modal antenna configurable in a plurality of antenna modes, where each antenna mode is associated with a distinct radiation pattern. The method can include determining a selected channel of the plurality of channels. The method can include determining a selected mode of the plurality of antenna modes based at least in a part on a weighting factor associated with the selected channel and with the selected mode of the modal antenna. The method can include communicating a control signal from the network access point to the OTA antenna system via the removable connection to configure the modal antenna in the selected mode of the plurality of antenna modes. The method can include communicating, by the network access point, media content associated with the OTA signal to a client device via a network communication link.

Another example aspect of the present disclosure is directed to an antenna system for use in distributing over the air (OTA) content. The antenna system can include a modal antenna configurable in a plurality of antenna modes, where each antenna mode is associated with a distinct radiation pattern. The modal antenna can be configured to receive an OTA signal associated with media content. The antenna system can include a control circuit configured to tune the antenna system to one of a plurality of channels. The antenna system can include a connector configured to form a removable connection and receive and transmit signals through the removable connection. The antenna system can include one or more non-transitory memory devices storing computer-readable instructions that, when implemented by one or more processors of a network access point to which the antenna system is connected by the removable connection, cause the antenna system to perform operations.

The operations can include communicating, to the network access point, data indicative of computer-readable instructions. The instructions can include detecting connection of the antenna system to the network access point via the removable connection. The instructions can include establishing a database of weighting factors respective to each of the plurality of antenna modes and each of the plurality of channels. The instructions can include communicating a control signal from the network access point to the OTA antenna system via the removable connection to configure the modal antenna in a selected mode of the plurality of antenna modes for a selected channel of the plurality of channels, where the selected mode is determined based at least in part on the database of weighting factors and the selected channel. The instructions can include receiving a signal associated with media content of the selected channel from the OTA antenna system via the removable connection. The instructions can include communicating the media content of the selected channel via a network communication link to one or more client devices.

The operations can include, subsequent to communicating the data indicative of instructions, receiving, from the network access point, the control signal. The control signal can include data indicative of the selected mode and the selected channel. The operations can include configuring the modal antenna in the selected mode. The operations can include tuning the antenna system to the selected channel. The operations can include communicating the signal associated with media content of the selected channel to the network access point via the removable connection.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 7 depicts one example type of database that can be used for configuring a modal antenna of an OTA antenna system according to example embodiments of the present disclosure;

DETAILED DESCRIPTION

Figure 1:
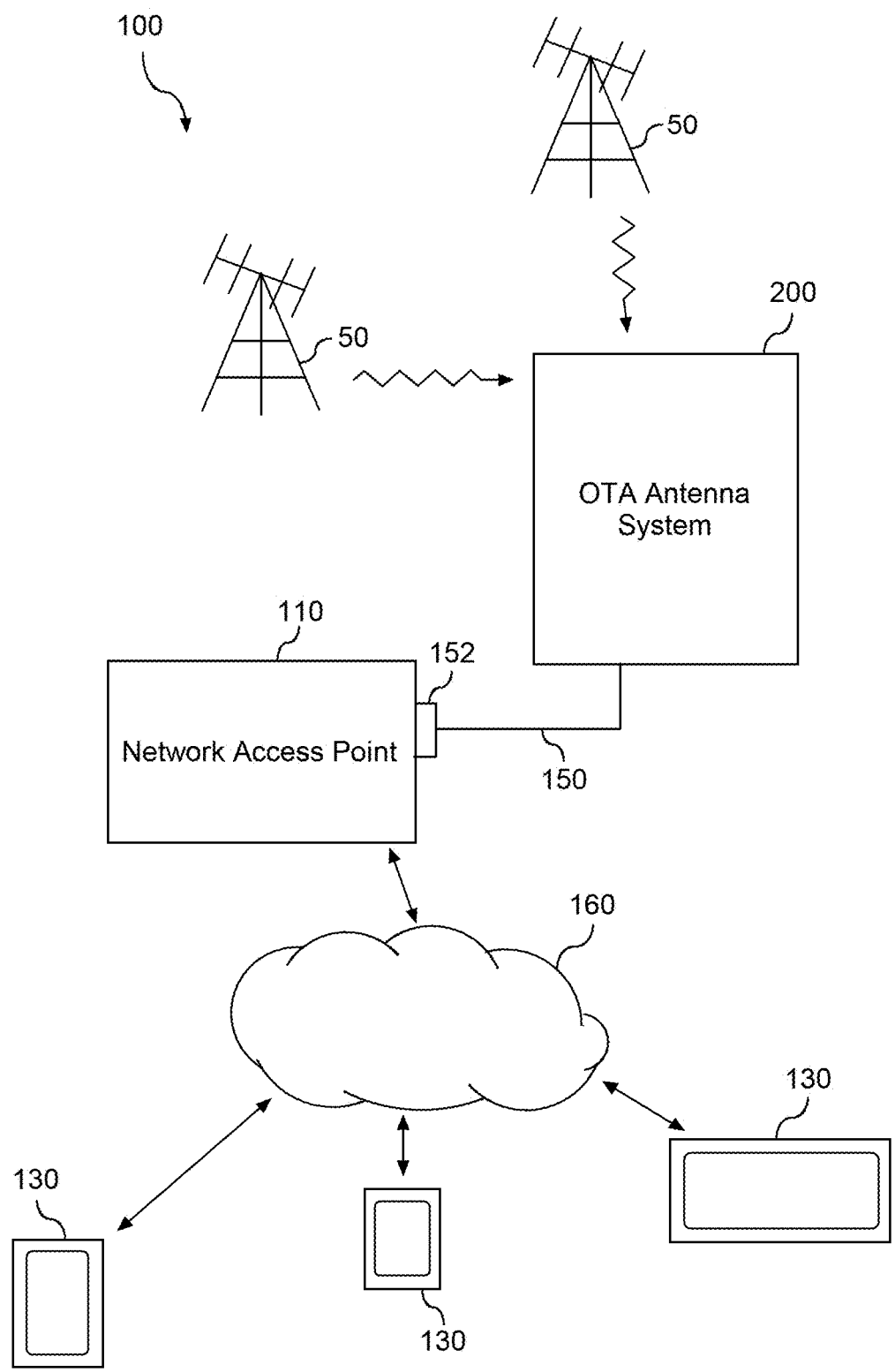
FIG. 1 depicts an example system for distribution of OTA media content according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to antenna systems for distributing OTA content (e.g., OTA media) to one or more client devices in a network, such as a wireless local area network (WLAN). According to example aspects of the present disclosure, an OTA antenna system can be configured to receive media content (e.g., local broadcast television media) over RF frequency bands in the VHF (30 MHz to 300 MHz) and/or UHF frequency bands (e.g., about 450 MHz to 900 MHz). The OTA antenna system (e.g., signals from a modal antenna) can be tuned to receive channels in the VHF and UHF band. Media content (e.g., television media) received over the channels can be demodulated and re-transmitted among client devices in a local area network (e.g., home devices connected to an 802.11 WiFi network).

More particularly, the OTA antenna system can be coupled to a network access point (e.g., a router) via a removable connection, such as a universal serial bus (USB) connection or other suitable removable connection. The network access point can be a router, such as a WiFi router. Additionally and/or alternatively, the network access point can be a modem, such as a cable modem (e.g., providing networking functionality). Additionally and/or alternatively, the network access point can be any other suitable device capable of accessing, establishing, providing, and/or managing networks (e.g., 802.11 networks) including devices where the networking functionality is provided in addition to other functions such as, for example, a cable provider set top box including networking functionality. Media content received over one or more channels in the VHF and/or UHF frequency bands can be received, demodulated, and provided to the network access point via the removable connection (e.g., USB connection). The network access point can communicate the media content to one or more client devices (e.g., smartphones, tablets, laptops, televisions, IoT devices, etc.) connected to the network access point via a communication link, such as a wireless communication link (e.g., 802.11 wireless network communication link).

In some embodiments, the OTA antenna system can include a modal antenna(s). The modal antenna(s) can be configured in a plurality of different antenna modes to provide for beam steering of the radiation pattern for the modal antenna. Each antenna mode can be associated with a different radiation pattern and/or polarization. The modal antenna(s) in the OTA antenna system can be configured in the antenna mode that provides a radiation pattern for the increased (e.g., optimum) communication link quality for receiving media content over one or more channels (e.g., optimized for multiple channels, optimized for a single channel, etc.). For example, in some embodiments, the modal antenna can include a radiating element and/or one or more parasitic elements.

The network access point can include one or more processors and one or more memory devices. The one or more memory devices can include computer-readable instructions that when executed by the one or more processors cause the one or more processors to perform operations. In some embodiments, for instance, the operations can include detecting connection of an OTA antenna system capable of receiving an OTA signal including media content at a plurality of channels to a network access point via a removable connection. The OTA antenna system can include a modal antenna configurable in a plurality of antenna modes, each antenna mode associated with a distinct radiation pattern. Additionally and/or alternatively, the operations can include establishing a database of weighting factors respective to each of the plurality of antenna modes and each of the plurality of channels. Additionally and/or alternatively, the operations can include communicating a control signal from the network access point to the OTA antenna system via the removable connection to configure the modal antenna in a selected mode of the plurality of antenna modes for a selected channel of the plurality of channels. The selected mode can be determined based at least in part on the database of weighting factors and the selected channel. Additionally and/or alternatively, the operations can include receiving a signal associated with media content of the selected channel from the OTA antenna system via the removable connection. Additionally and/or alternatively, the operations can include communicating the media content of the selected channel via a network communication link to one or more client devices.

Additionally and/or alternatively, in some embodiments, the operations can include receiving, at a network access point, a media signal associated with media content from an OTA antenna system via a removable connection. The OTA antenna system can be capable of being tuned to a plurality of channels. The OTA antenna system can include a modal antenna configurable in a plurality of antenna modes, each antenna mode associated with a distinct radiation pattern. Additionally and/or alternatively, the operations can include determining a selected channel of the plurality of channels. Additionally and/or alternatively, the operations can include determining a selected mode of the plurality of antenna modes based at least in a part on a weighting factor associated with the selected channel and with the selected mode of the modal antenna. Additionally and/or alternatively, the operations can include communicating a control signal from the network access point to the OTA antenna system via the removable connection to configure the modal antenna in the selected mode of the plurality of antenna modes. Additionally and/or alternatively, the operations can include communicating, by the network access point, media content associated with the OTA signal to a client device via a network communication link.

In some embodiments, the operations can include determining a selected mode for the modal antenna(s) of the OTA antenna system. The selected mode can be determined based at least in part on a channel quality indicator (CQI) for the communicating over the channel in a particular antenna mode of the plurality of antenna modes. The CQI can be a metric such as, for instance, a channel quality indicator (CQI), such as, for example, receive power (RP), signal to noise ratio (SNR), signal-to-interference-plus-noise ratio (SINR), magnitude error ratio (MER), error vector magnitude (EVM), bit error rate (BER), block error rate (BLER), or packet error rate (PER), or other metrics known in the art.

For instance, in some embodiments, the one or more memory devices can store (e.g., temporarily and/or persistently) data indicative of one or more CQI(s) for each channel for each antenna mode of the modal antenna. The CQI(s) can be correlated to a quality score for receiving media content over the channel when the modal antenna is configured in the selected mode. Additionally and/or alternatively, the quality score can be correlated to a weighting factor for each channel and each mode. The instructions can specify determining a selected mode to provide the best (e.g., highest) and/or improved quality score for communication with a selected channel and/or for multiple channels. Once the selected mode is determined for communicating over a channel, the network access point can be configured to communicate control signals to configure the modal antenna in the selected mode via the removable connection. In this way, computer-readable instructions (e.g., software) operable to configure the modal antenna of the OTA antenna system coupled to the network access point via the removable connection can be resident at the network access point.

For instance, in some embodiments, a user can connect an OTA antenna system to a network access point via a USB connection (e.g., USB 1.0, USB 1.1, USB 2.0, USB 3.0, USB 3.1, USB 3.2, USB Type A, USB Type C) or other removable and/or otherwise installable connection (e.g., HDMI, Thunderbolt, DisplayPort, Ethernet port, etc.). Software associated with configuring and driving the modal antenna(s) of the OTA antenna system can be obtained via the USB connection and stored in one or more memory devices of the network access point. During operation, the network access point can configure the modal antenna(s) and otherwise control the OTA antenna system to receive OTA media content from one or more channels in the VHF and/or UHF bands. The network access point can communicate the media content to one or more client devices over a network communication link (e.g. Ethernet, 802.11, etc.).

For instance, in some embodiments, the one or more memory devices storing the computer-readable instructions can obtain the computer-readable instructions from the OTA antenna system. For example, the OTA antenna system can include one or more (e.g., non-transitory) memory devices that store computer-readable instructions. The instructions can be transmitted to and/or implemented by one or more processors of a network access point to which the antenna system is connected (e.g., by the removable connection).

The instructions stored on the antenna system can cause the antenna system to perform operations including at least, for example, communicating, to the network access point, data indicative of computer-readable instructions including detecting connection of the antenna system to the network access point via the removable connection, establishing a database of weighting factors respective to each of the plurality of antenna modes and each of the plurality of channels, communicating a control signal from the network access point to the OTA antenna system via the removable connection to configure the modal antenna in a selected mode of the plurality of antenna modes for a selected channel of the plurality of channels, the selected mode determined based at least in part on the database of weighting factors and the selected channel, receiving a signal associated with media content of the selected channel from the OTA antenna system via the removable connection, and/or communicating the media content of the selected channel via a network communication link to one or more client devices. For instance, upon and/or subsequent to formation of the removable connection between the OTA antenna system and the network access point, such as by inserting a connector of the OTA antenna system into a corresponding connector (e.g., receptor) of the network access point, the network access point can download, from the OTA antenna system, software from the OTA antenna system instructing the network access point to operate the OTA antenna system and/or provide OTA signals to one or more client devices. In this way, a user can easily interface with the network access point to implement the desired functionality according to example aspects of the present disclosure, and may be preventing from performing a lengthy install process. Additionally and/or alternatively, in some implementations, the instructions implemented by the network access point can be communicated in any suitable manner, such as through a network (e.g., downloaded from an internet server), from a client device (e.g., a computer connected to the network provided by the network access point), through other insertable media (e.g., compact disc), and/or any other suitable manner.

Additionally and/or alternatively, the instructions stored on one or more memory devices of the antenna system can cause the antenna system to perform operations for obtaining and/or communicating OTA signals and/or configuring and/or tuning the modal antenna, such as, for instance (e.g., subsequent to communicating the data indicative of instructions to the network access point), receiving, from the network access point, the control signal, the control signal including data indicative of the selected mode and the selected channel, configuring the modal antenna in the selected mode, tuning the antenna system to the selected channel, and communicating the signal associated with media content of the selected channel to the network access point via the removable connection.

The systems and methods according to example aspects of the present disclosure can have a number of technical effects and benefits. For instance, a network access point (e.g., wireless router) can be configured as a distribution platform for OTA media content to a plurality of client devices in a home or building simply be connecting an OTA antenna system to the network access point via a USB connection or other suitable connection. The OTA antenna system can include one or more modal antennas that can be configured by the network access point for beam steering to point radiation patterns in directions to provide increased communication link quality for receiving OTA media content, leading to reduced errors and improved quality of media content distribution in the home or business.

Additionally and/or alternatively, the systems and methods according to example aspects of the present disclosure can provide for improved streaming quality and/or connection quality associated with the OTA antenna system. For example, the OTA antenna system can include a plurality of weighting factors associated with channel and with mode. Upon configuring the OTA antenna system (e.g., tuning) for a particular channel, the modal antenna of the OTA antenna system can additionally be configured in a mode of the modal antenna that provides improved performance for that channel. Thus, a single mode of the modal antenna is not required to be sufficient for each channel. Additionally and/or alternatively, improved reception of each channel can be obtained. Additionally and/or alternatively, channels which may be unavailable at a first mode may nonetheless be obtained at a second mode with seamless transition.

A "modal antenna" refers to an antenna capable of being operated in a plurality of antenna modes. Each antenna mode is associated with a distinct radiation pattern and/or characteristic. For instance, in some implementations, the distinct radiation patterns and/or characteristics can be enacted by adjusting electrical characteristics of one or more tunable components (e.g., active elements, parasitic elements, etc.) included in the modal antenna. A "channel quality indicator" (CQIs) provides a metric indicative of communication link quality over a channel. Example CQIs include receive power (RP), signal to noise ratio (SNR), signal-to-interference-plus-noise ratio (SINR), magnitude error ratio (MER), error vector magnitude (EVM), bit error rate (BER), block error rate (BLER), or packet error rate (PER). A "channel" refers to a specific frequency channel in the VHF band and/or UHF band over which television media content can be broadcast. The use of the term "about" in conjunction with a numerical value refers to within 20% of the stated numerical value.

FIG. 1 depicts an example system 100 for distribution of OTA media content according to example embodiments of the present disclosure. The system 100 includes an OTA antenna system 200 operable to receive television media content broadcast over different channels in the VHF and/or UHF bands from, for instance, broadcast towers 50. The OTA antenna system 200 can be coupled to a network access point 110 (e.g., WLAN router).

The OTA antenna system 200 can be coupled to the network access point 110 via a USB connection 150 at a USB port 152. The USB connection 150 can be, for instance, USB 1.0, USB 1.1, USB 2.0, USB 3.0, USB 3.1, USB 3.2, USB Type A, USB Type C, or other USB connection. For example, the USB connection can include at least a positive supply line, a negative supply line, a positive data line, and/or a negative data line. Aspects of the present disclosure are discussed with reference to a USB connection. Those of ordinary skill in the art, using the disclosures provided herein, will understand that other removable connections can be used without deviating from the scope of the present disclosure.

The OTA antenna system 200 can receive an OTA signal associated with media content broadcast over one or more channels. For instance, the OTA signal can include (e.g., disparate) media content from each channel. The channels can be, for example, different frequency bands, different multiplexing divisions, etc. The OTA antenna system 200 can demodulate the signals and provide a signal associated with the media content to the network access point 110. For instance, the signal associated with the media content can include data for some or all channels and/or an individual (e.g., selected) channel. The network access point 110 can receive the signal associated with the media content from the OTA antenna system 200 over USB connection 150. The network access point 110 can then act as a server and serve the media content to one or more client devices 130 over a network 160.

The network 160 can include any combination of wired and/or wireless communication links. For instance, the network 160 can be an 802.11 (WiFi) network that provides a wireless local area network in a home, building, or other space. The network 160 can further include wired communication links, such as Ethernet or other wired communication links. Communication over network 160 can be accomplished using any suitable protocol and/or protection scheme without deviating from the scope of the present disclosure.

The client devices 130 can be, for instance, smartphones, tablets, wearable devices, laptops, desktops, televisions, displays with one or more processors, IoT devices, or other suitable electronic device capable of communicating with network access point 110 over network 160. The client devices 130 can include one or more processors and one or more memory devices. The one or more memory devices can store computer-readable instructions (e.g., software) that when executed by the one or more memory devices cause the one or more processors to perform operations. The operations can include, for instance, obtaining media content communication from network access point 110 over network 160 and providing for display on a display device the media content for viewing by a user.

For instance, in some embodiments, the operations can include communicating a connection request to a server computing system (e.g., a network access point), establishing a communication link with the server, receiving channel tuning information (e.g., an electronic programming guide, channel list, etc.) from the server, and/or displaying the media content. IN some embodiments, the client device can attempt to communicate a connection request for a plurality of retries until the communication link is established, such as a finite number of retries (e.g., three retries). If the client is unable to form a communication link with the server after the retries, the client may notify the user, allow the user to continue retrying, provide diagnostic information to the user, and/or take other suitable actions to facilitate connecting with the server and/or receiving media content.

Figure 2:
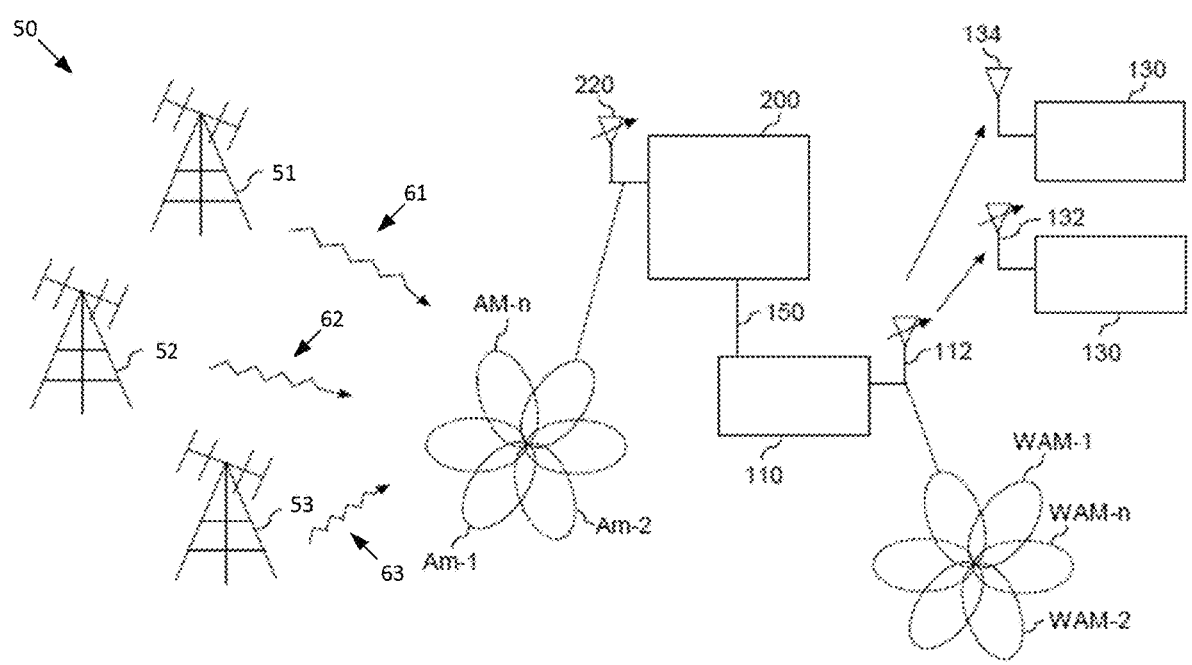
FIG. 2 depicts reception of OTA signals by the OTA antenna system and communication of signals by a network access point according to example aspects of the present disclosure.

FIG. 2 depicts reception of OTA signals by the OTA antenna system and communication of signals by a network access point according to example aspects of the present disclosure. As shown, the OTA antenna system 200 can include a modal antenna 220. Example configurations of modal antennas for use in OTA antenna system will be discussed in detail below. The modal antenna 220 can be configured to provide for beam steering functionality to improve link quality for receiving OTA signal(s), such as signal 52a (e.g., Channel X) from broadcast tower 51, signal 62 (e.g., Channel Y) from broadcast tower 52, and signal 63 (e.g., Channel Z) from broadcast tower 53.

More particularly, the modal antenna 220 for the OTA antenna system 200 can be configurable in a plurality of antenna modes AM-1, AM-2, AM-n. Each antenna mode can be associated with a different radiation pattern and/or polarization. The modal antenna 220 can be controlled to operate in a specific antenna mode depending on the channel for desired OTA signal reception. For instance, as one example, the modal antenna 220 can be configured in mode AM-1 for receiving signal 61 (e.g., Channel X) from broadcast tower 51. The modal antenna 220 can be configured in mode AM-1 for receiving signal 62 (e.g., Channel Y) from broadcast tower 52. The modal antenna 220 can be configured in mode AM-n for receiving signal 63 (e.g., Channel Z) from broadcast tower 53. As will be described in detail below, the network access point 110 can include computer-readable instructions (e.g., software) configured to provide control signals over USB connection 150 to OTA antenna system 200 for configuring the modal antenna 220 in a selected mode for each channel. In some embodiments, to determine the control signal, the selected mode for each channel can be computed dynamically (e.g., upon channel switch) and/or stored in and/or accessed from a lookup table.

In some embodiments, as shown in FIG. 2, the network access point 110 can also include a modal antenna 112. The modal antenna 112 can similarly be configurable in a plurality of antenna modes to provide beam steering capability to improve communication link quality with the one or more client devices 130. The modal antenna 112 can be configurable in a plurality of antenna modes WAM-1, WAM-2, WAM-n. Each antenna mode can be associated with a different radiation pattern and/or polarization. The modal antenna 112 can be controlled to operate in a specific antenna mode depending on the client device 120 with which the network access point 110 is communicating. For instance, as one example, the modal antenna 112 can be configured in mode WAM-1 for communicating with a first client device and in mode WAM-2 for communication with a second client device. The network access point 110 can include computer-readable instructions (e.g., software) configured to control modal antenna 112 to operate in a selected mode to increase communication link quality the one or more client devices 130.

As shown in FIG. 2, one or more of the client devices 130 may also include a modal antenna 132 operable in a plurality of different modes. Each mode can be associated with a different radiation pattern and/or polarization. The client device 130 can be configured to control the modal antenna 132 to increase communication link quality with the network access point 110. The client device 130 can also include a passive antenna 134. Passive antennas 134 can, for instance, provide static radiation patterns that are not capable of beam steering or beam forming.

Figure 3:
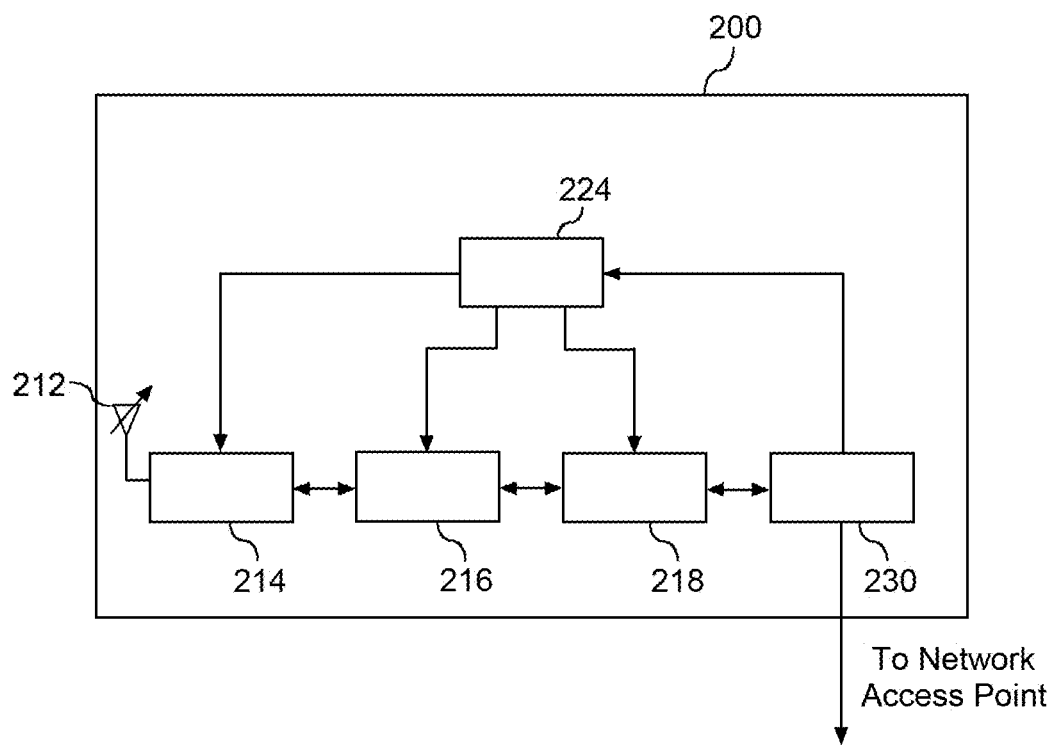
FIG. 3 depicts a schematic of an example OTA antenna system according to example embodiments of the present disclosure.
Figure 4:
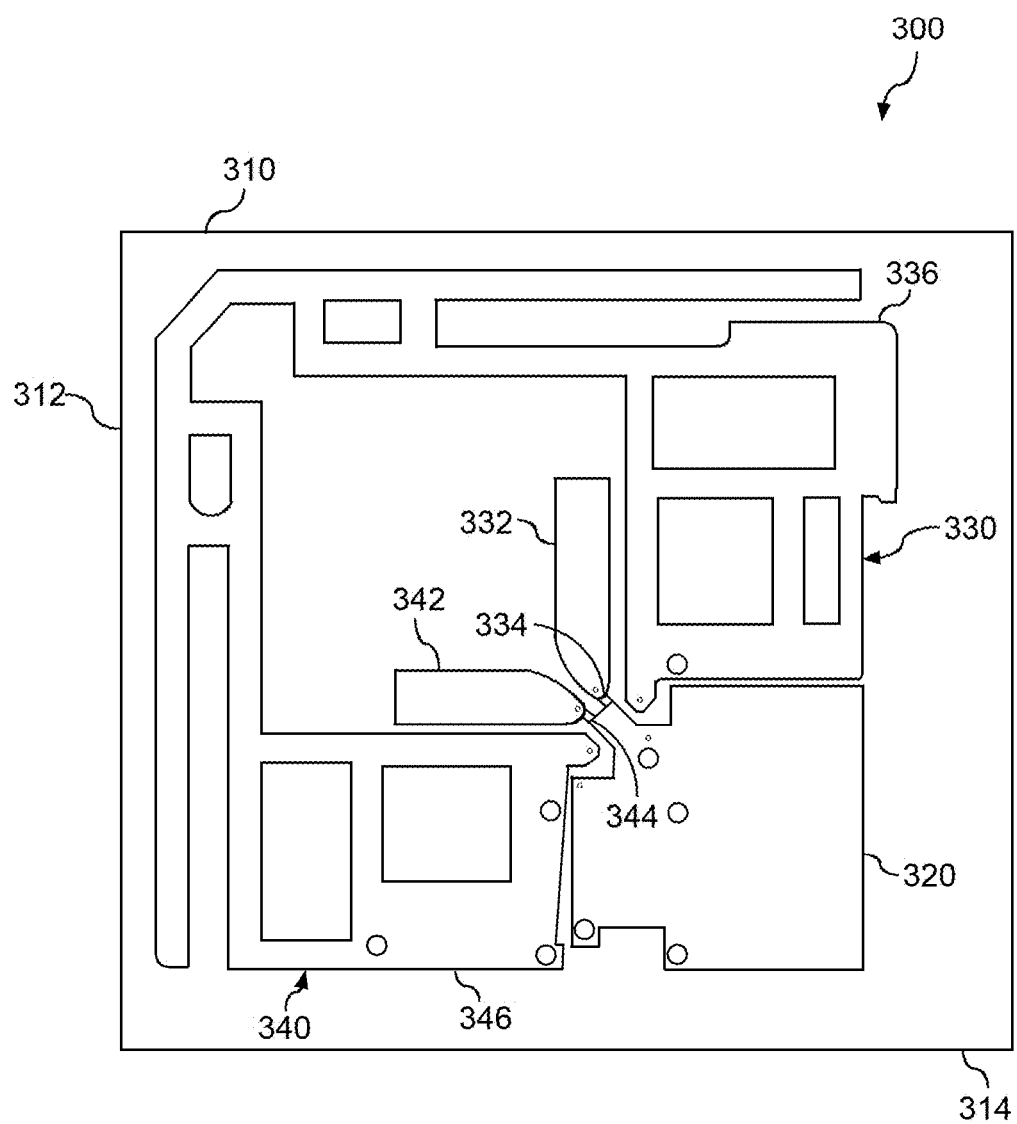
FIG. 4 depicts an example modal antenna that can be used in an OTA antenna system according to example embodiments of the present disclosure.

FIG. 3 depicts a schematic of an example OTA antenna system 200 according to example embodiments of the present disclosure. As discussed, the OTA antenna system 200 includes a modal antenna 212 capable of operation in a plurality of antenna modes to implement beam steering functionality. An example modal antenna 212 capable of receiving OTA signals in the VHF and/or UHF band is illustrated in FIG. 4.

As shown in FIG. 3, the modal antenna 212 is coupled to RF circuitry 214 (e.g., front end). The RF circuitry 214 can include one or more circuits configured for impedance matching, mode selection of the modal antenna 212, low noise amplifiers, etc. As discussed in more detail below, modal antennas can include one or more parasitic elements. In some implementations, the parasitic element and/or a radiating element of the modal antenna can be coupled to one or more components, such as switches, inductors, capacitors, tunable inductors, tunable capacitors, or solid state devices to adjust the antenna mode of the modal antenna. These components can be included within the RF circuitry 214, but may be located elsewhere in the OTA antenna system 200.

In some implementations, a VHF and/or UHF signal (e.g., OTA signal) received by the modal antenna can be provided to a tuner 216. The tuner 216 can select (e.g., filter) a particular channel (e.g., frequency band) received by the modal antenna. In some embodiments, the tuner 216 can be controlled by a controller 224 based on one or more commands from a network access point (e.g., received via the USB connection) to select a particular channel providing OTA media content to the network access point.

As one particular example, a user can access an application implemented on a client device that allows for viewing OTA media content and can interact with the application to request a particular OTA channel (e.g., a selected channel) for viewing. The client device can send this request to the network access point over a network (e.g., 802.11 WiFi network). The network access point can send commands via the USB connection to the OTA antenna system to control the tuner 216 to tune the OTA antenna system 200 to receive and demodulate signals associated with the request channel(s). In some embodiments, a user can control the antenna through voice commands received from a device associated with a digital assistant service. According to example aspects of the present disclosure, such as in addition to tuning the OTA antenna system 200 by tuner 216, the OTA antenna system 200 can select a selected mode for modal antenna 212 in response to the user request to provide improved connectivity for the selected channel.

The OTA antenna system can include a demodulator 218. The demodulator 218 can demodulate the signals received from the tuner to extract the media content (e.g., from a selected channel). Signals associated with the media content can then be provided to communication interface 230. The communication interface 230 can be configured to communicate the signals associated with the media content to the network access point, for instance, over the USB connection. The communication interface 230 can include circuitry for packaging content extracted from the demodulator 218 into an appropriate format for communicating via the USB connection.

The communication interface 230 can also be configured to receive commands from the network access point via the USB connection. The commands can include, for instance, a request to tune the OTA antenna system to a particular channel. The commands can include, for instance, a command to configured the modal antenna 212 in a particular antenna mode (e.g., to increase communication link quality). The commands can be provided to controller 224. The controller 224 can then control aspects of the OTA antenna system 200 (e.g., RF circuitry 214, tuner 216, demodulator 218) to implement the commands.

FIG. 4 depicts an example modal antenna 300 that can be used in an OTA antenna system 200 according to example embodiments of the present disclosure. As shown, the modal antenna 300 includes a substrate 310 and a ground plane 320 formed on the substrate 310. In some implementations, the modal antenna 300 includes a first radiating element 330. The modal antenna can include a first parasitic element 332 positioned adjacent to the first radiating element 330. An active element (e.g., switch, tunable inductor, tunable capacitor, capacitor, and/or combination thereof) 334 can be coupled between the first parasitic element 332 and the ground plane 320. The active element 334 can include a multi-port switch configured to open-circuit, short-circuit, or reactively load the first parasitic element 332 to adjust a radiation pattern of the radiating element 330. In this way, the active element 334 can be controlled to adjust an antenna mode of the modal antenna 300.

In some implementations, the antenna 300 can include a second radiating element 340. The modal antenna 300 can include a second parasitic element 342 positioned adjacent to the second antenna 340. An active element (e.g., switch, tunable inductor, tunable capacitor, capacitor, and/or combination thereof) 344 can be coupled between the first parasitic element 342 and the ground plane 320. The active element 344 can include a multi-port switch configured to open-circuit, short-circuit, or reactively load the first parasitic element 342 to adjust a radiation pattern of the radiating element 330. In this way, the active element 344 can be controlled to adjust an antenna mode of the modal antenna 300.

Figure 5:
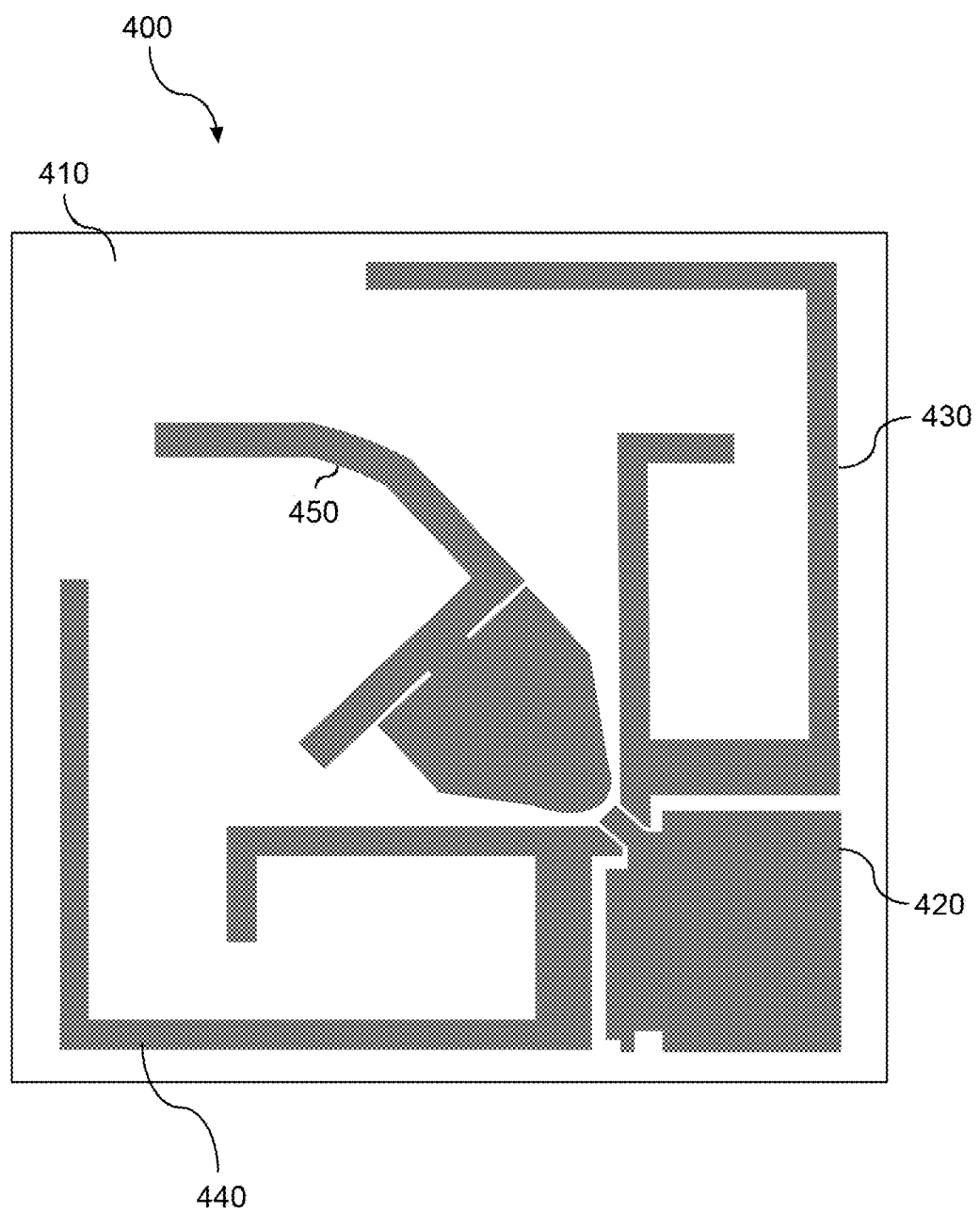
FIG. 5 depicts an example modal antenna that can be used in an OTA antenna system according to example embodiments of the present disclosure.

Referring now to FIG. 5, a schematic of an antenna 400 is provided according to example embodiments of the present disclosure. As shown, the antenna 400 includes a substrate 410 and a ground plane 420 formed on the substrate 410. In some implementations, the antenna 400 includes a first antenna element 430, a second antenna element 440, and a third antenna element 450. It should be appreciated, however, that the antenna 400 can include more or fewer antenna elements. It should also be appreciated that each of the first antenna element 430, the second antenna element 440, and the third antenna element 450 can, in some implementations, be positioned on the substrate 410 adjacent the ground plane 420.

In example embodiments, the first antenna element 430 can have a horizontal polarization. Alternatively and/or additionally, the first antenna element 430 can be configured to receive a RF signal associated with a UHF band or a VHF band. In example embodiments, the second antenna element 440 can have a vertical polarization. Alternatively and/or additionally, the second antenna element 440 can be configured to receive a RF signal associated with the UHF band or the VHF band. In example embodiments, the third antenna element 450 can have a slant polarization relative to the horizontal polarization of the first antenna element 430 and the vertical polarization of the second antenna element 440. In some implementations, the slant polarization can span from about negative 45 degrees to positive 45 degrees. It should be appreciated, however, that the slant polarization can span any suitable range of angles. Alternatively and/or additionally, the third antenna element 450 can be configured to receive a RF signal associated with the UHF band or the VHF band.

Figure 6:
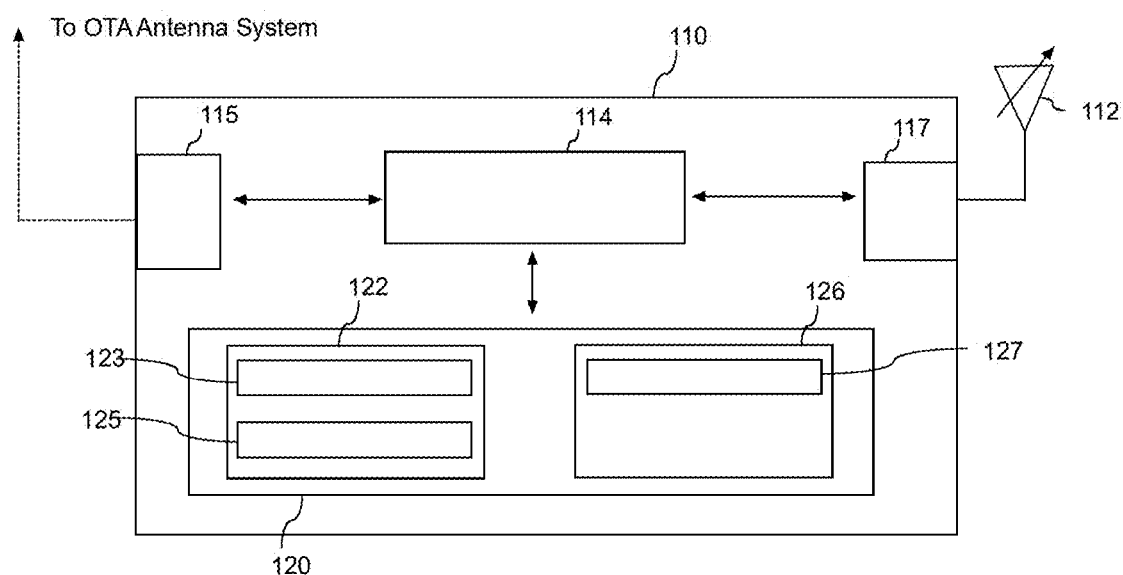
FIG. 6 depicts a schematic of an example network access point according to example embodiments of the present disclosure.

FIG. 6 depicts a schematic of an example network access point 110 according to example embodiments of the present disclosure. As discussed, the network access point 110 can include a modal antenna 112 operable in a plurality of different modes to wirelessly communicate information to one or more client devices. The network access point 110 can include one or more processors 114 and one or more memory devices 120. The one or more memory devices can store computer-readable instructions 122 and data 126.

The network access point 110 can include a communications interface 115 configured to provide for communication with an OTA antenna system. The communications interface 115 can be, for instance, a USB interface. The communications interface 115 can include appropriate mechanical ports for receiving a connector (e.g., a USB connector) as well as appropriate interface circuitry for communicating over the connector. Example information communicated via the connector and/or communications interface 115 can include, for instance, signals associated with media content obtained from the OTA antenna system, software obtained from the OTA antenna system, control signals for configuring the OTA antenna system, etc.

The network access point 110 can include communications interface 117. Communications interface 117 can include, for instance, one or more transceivers, receivers, transmitters, front end modules, baseband processors, RF circuitry, antenna control modules, etc. for controlling communications via modal antenna 112 and/or other communication links (e.g., passive antennas, hardwired links (Ethernet), etc. In some embodiments, the communications interface 117 can include an antenna control module or antenna tuning module operable to configure the modal antenna 112 in one of a plurality of different modes. Example modal antenna(s) 112 will be discussed in more detail below.

The computer-readable instructions 122 can include different software engines configured to provide desired functionality for the network access point. For instance, the computer-readable instructions 122 can include a first set of instructions 123 associated with providing wireless routing and network access point functionality (e.g., receiving and transmitting of information over a network). The computer-readable instructions 122 can include a second set of instructions 124 associated with the OTA antenna system. For instance, the second set of instructions 124 can include antenna drivers for operating the antenna(s) of the OTA antenna system. The second set of instructions 124 can include instructions associated with configuring the modal antenna(s) of the OTA antenna system in a selected mode of a plurality of antenna modes.

The data 126 can include, for instance, a database of information associated with operation of each of the modal antenna in each of the antenna modes. For instance, the data 126 can include a database 127 (e.g., lookup table, matrix, correlation) identifying one or more CQI(s) and/or quality scores computed based on CQI(s) associated with reception of OTA signals for each channel for each mode of the modal antenna(s). Additionally and/or alternatively, the database 127 can include data associated with weighting factors respective to each channel and/or each mode of the modal antenna(s) of the OTA antenna system. For instance, the weighting factors can be computed based at least in part on a CQI of each channel in each of the plurality of modes. The processor(s) 114 can determine a selected mode for operating the modal antenna(s) of the OTA antenna system based at least in part on the information in the database 127, as further described herein.

As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Memory device(s) can include memory element(s) including, but not limited to, computer readable medium (e.g., random access memory (RAM)), computer readable non-volatile medium (e.g., flash memory), and/or other suitable memory elements or combinations thereof.

Referring now to FIG. 7, in some embodiments, the instructions 124 executed by the processor(s) 114 of the network access point 110 can be configured to populate a look-up table or database 600 with information or "data" indicative of performance of the modal antenna of the OTA antenna system while operating in each of the plurality of modes. As will be discussed below in more detail, the instructions 124 can be executed by the processors 114 of the network access point 110 determine a selected mode of operation for the modal antenna of the OTA antenna system based at least in part on the data included in the database 600.

In some implementations, the system can determine a weighting factor that is respective to a given channel (e.g., channels 1 through N) and a given antenna mode (e.g., modes 1 through M) of the plurality of antenna modes in which the modal antenna can operate, as described herein. It should be appreciated that M is a variable indicative of the total number of antenna modes. For example, if the modal antenna can operate in four different modes, the variable M would be assigned the numerical value "4". It should be appreciated that the system can determine weighting factor based at least in part on a CQI based, at least in part, on the metric(s) obtained via signals from OTA antenna system. Furthermore, N is a variable indicative of a total number of channels. N can be a number of received channels (e.g., signals having reception above a minimum threshold in at least one and/or all modes of the antenna system) and/or a total number of configurable channels for which the OTA antenna can be configured to receive.

For instance, the weighting factor(s) can vary depending on a magnitude of the CQI for a given channel and a given mode. For instance, a weighting factor for a particular channel and mode combination can be proportionally related to a CQI at the given channel and mode combination. In some embodiments, the weighting factor can be based at least in part on a CQI at all channels for a given mode.

FIG. 7 depicts one example type of database that can be used for configuring a modal antenna of an OTA antenna system according to example embodiments of the present disclosure. Those of ordinary skill in the art, using the disclosures provided herein, will understand that other types of data, weighting factors, CQIs, and quality scores can be used without deviating from the scope of the present disclosure.

Figure 8:
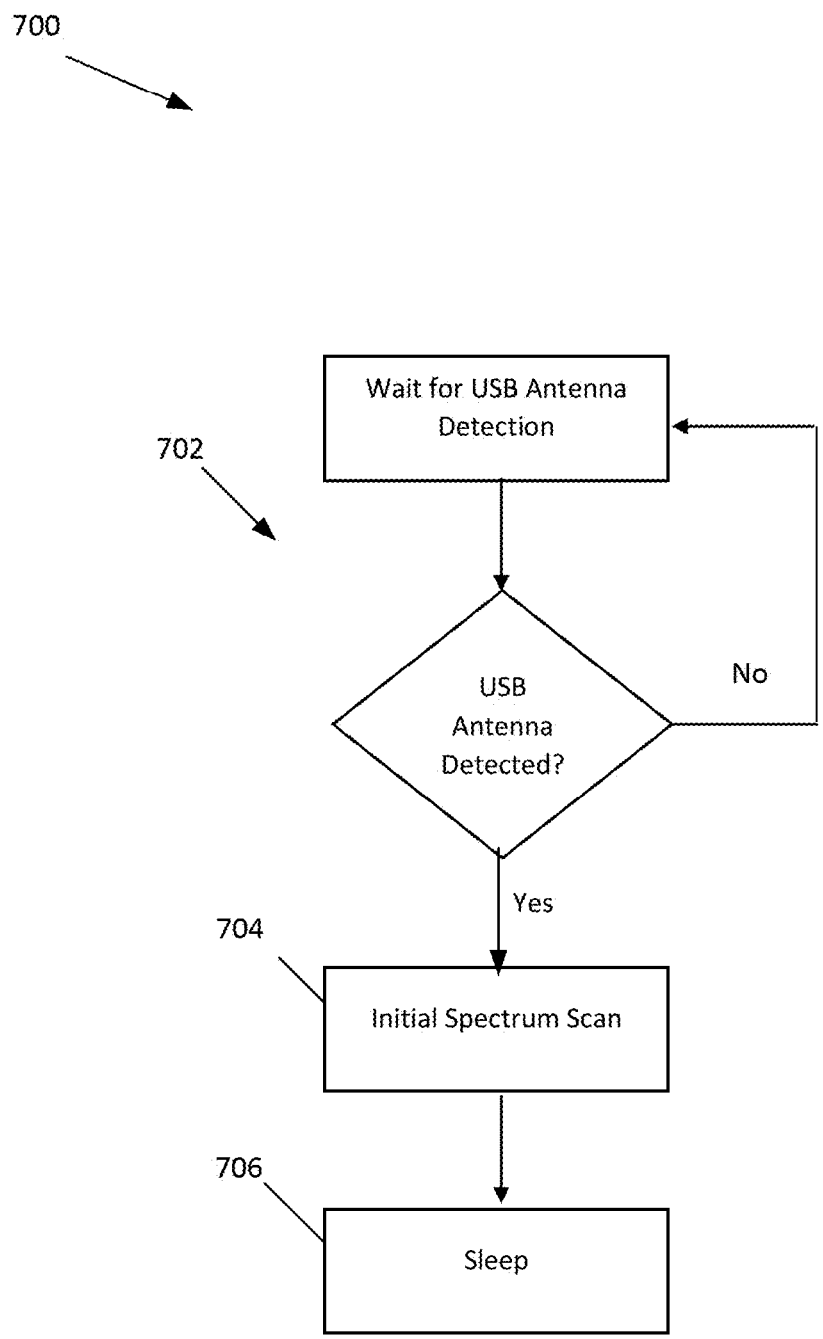
FIG. 8 depicts a flow diagram of a method for initializing an antenna system according to example embodiments of the present disclosure.

FIG. 8 depicts a flow diagram of a method 700 for initializing an antenna system according to example embodiments of the present disclosure. The method 700 may be implemented using, for instance, the antenna system discussed above with reference to FIG. 1 (e.g., by the network access point). FIG. 8 depicts steps performed in a particular order for purposes of illustration and discussion. Those of ordinary skill in the art, using the disclosures provided herein, will understand that various steps of the method 700 may be adapted, modified, rearranged, performed simultaneously or modified in various ways without deviating from the scope of the present disclosure.

The method 700 can include, at 702, detecting (e.g., at a network access point) connection of an OTA antenna system capable of receiving an OTA signal including media content at a plurality of channels to a network access point via a removable connection. The OTA antenna system can include a modal antenna configurable in a plurality of antenna modes. Each antenna mode can be associated with a distinct radiation pattern.

For instance, the network access point can determine that the OTA antenna system has been physically connected to a USB port of the network access point. For instance, a user can insert a removable connector (e.g., USB male/female) of the OTA antenna system into a corresponding removable connector (e.g., USB female/male) at the network access point. The removable connection can provide signal transfer (e.g., data transfer) between the OTA antenna system and the network access point. For instance, in some embodiments, the removable connection can include at least one signal line and/or at least one supply (e.g., power and/or ground) line. For example, in some embodiments, the removable connection can be or can include a USB connection.

For instance, in some implementations, the network access point can wait until an OTA antenna system is detected. The network access point can periodically query a removable connection (e.g., a USB port) to determine if an OTA antenna system has been inserted. For instance, the network access point can periodically obtain signal measurements, wait for the presence of a handshake signal, provide a handshake signal and wait for a corresponding response to the handshake signal, and/or through any other suitable manner detect connection of the OTA antenna system.

The method 700 can include, at 704, establishing a database of weighting factors respective to each of a plurality of antenna modes and each of a plurality of channels. For example, the weighting factors can be determined based at least in part on a channel quality indicator at each of the plurality of channels and/or modes. The database can be established subsequent to detecting connection of the OTA antenna system to the network access point via the removable connection. For instance, the database can be established by performing an initial spectrum scan (e.g., in response to powering on the network access point, inserting the OTA antenna system, etc.). An example method for establishing a database of weighting factors (e.g., an example initial spectrum scan) is discussed with reference to method 800 of FIG. 9.

The method 700 can include, at 706, entering a standby mode (e.g., a sleep mode) until the occurrence of a detected event. In some implementations, the detected event can occur when a predetermined amount time lapses since the modal antenna was configured in a selected operating mode. Alternatively or additionally, the detected event can occur when metrics obtained indicate an amount of interference associated with the signals exceeds a threshold value. In some implementations, the detected event can occur based on a detected change in position of the antenna. In some implementations, the detected event can occur when an OTA antenna system is connected to a network access point via a USB connection. The detected event can be a user request to view a particular channel. In some implementations, the detected event can occur when user-input is received via an input device (e.g., a client device). More specifically, the input device can include one or more mechanical interface elements (e.g., push-button) in operative communication with the controller. Alternatively or additionally, the input device can include a mobile device (e.g., smartphone, tablet, laptop, etc.) that is communicatively coupled to the controller via any suitable wired or wireless communication link.

Figure 9:
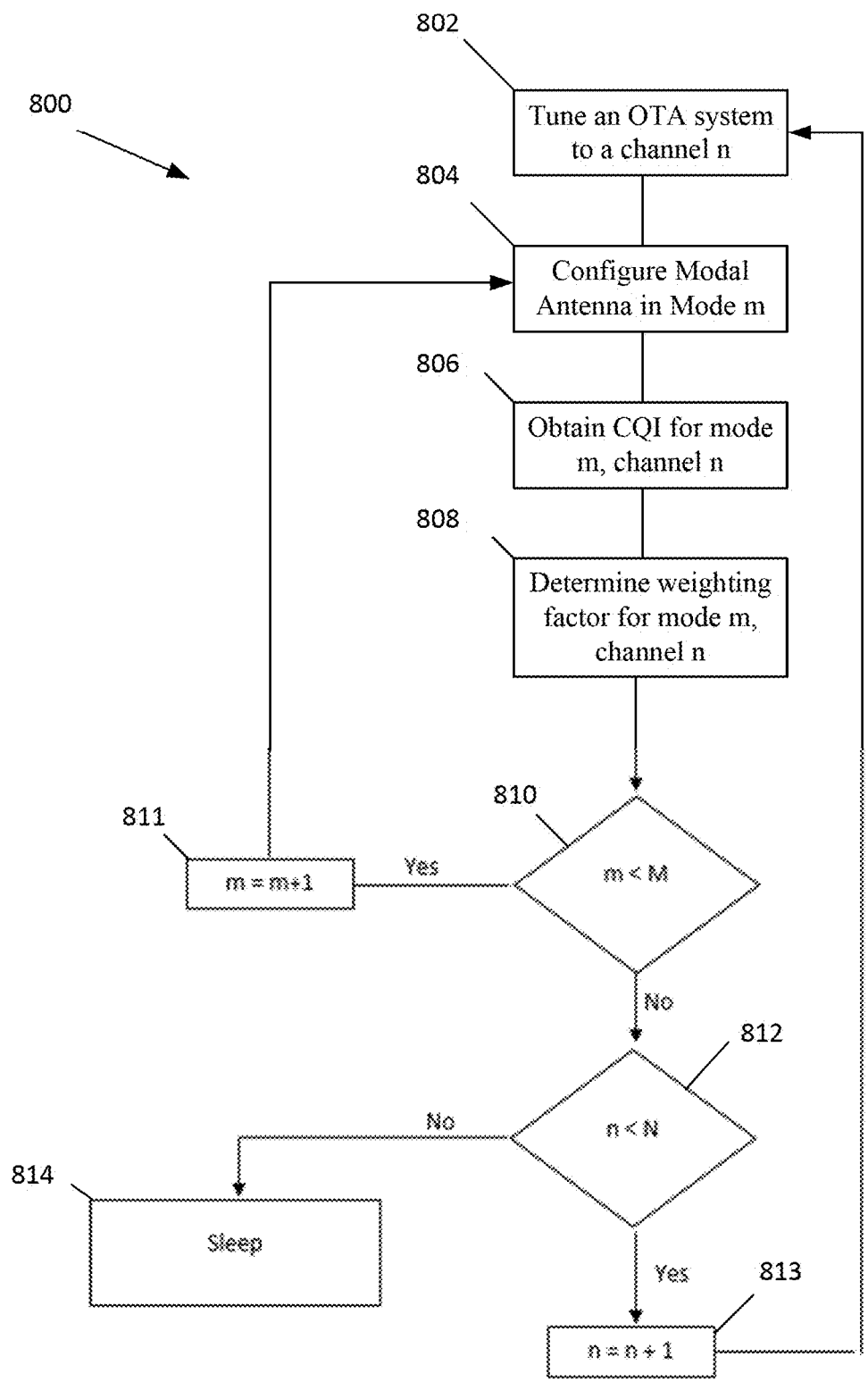
FIG. 9 depicts a flow diagram of a method 800 for establishing a database of weighting factors (e.g., an example initial spectrum scan) according to example embodiments of the present disclosure.

FIG. 9 depicts a flow diagram of a method 800 for establishing a database of weighting factors (e.g., an example initial spectrum scan) according to example embodiments of the present disclosure. The method 800 may be implemented using, for instance, the antenna system discussed above with reference to FIG. 1 (e.g., by the network access point). FIG. 9 depicts steps performed in a particular order for purposes of illustration and discussion. Those of ordinary skill in the art, using the disclosures provided herein, will understand that various steps of the method 800 may be adapted, modified, rearranged, performed simultaneously or modified in various ways without deviating from the scope of the present disclosure.

The method 800 can include, at 802, tuning the OTA antenna system to a channel n. For instance, portions of the method 800 can be repeated for each channel n of a plurality of N channels. For instance, a counter variable n can be initially assigned a first value (e.g., 0 or 1). Tuning the OTA antenna system to a channel n can include, for example, reconfiguring a tuning circuit (e.g., tuner 216 of FIG. 2) to receive an OTA signal associated with the channel n. For instance, signal handling characteristics (e.g., filtering characteristics) of a tuning circuit may be adjusted.

The method 800 can include, at 804, configuring a modal antenna in a mode m. For instance, portions of the method 800 can be repeated for each mode m of a plurality of M modes. For instance, a counter variable m can be initially assigned a first value (e.g., 0 or 1). Configuring the modal antenna can include communicating a control signal (e.g., from a network access point) to the OTA antenna system via the removable connection to configure the modal antenna in the mode m. As one example, the OTA antenna system can adjust an electrical characteristic of a modal antenna (e.g., a parasitic element) to alter the radiation pattern of the modal antenna such that the modal antenna is configured in the mode m. Further examples of modal antennas are discussed with reference to FIGS. 14-16.

The method 800 can include, at 806, obtaining a channel quality indicator associated with the channel n and with the mode m. For instance, the channel quality indicator can be a metric, such as, for example, receive power (RP), signal to noise ratio (SNR), signal-to-interference-plus-noise ratio (SINR), magnitude error ratio (MER), error vector magnitude (EVM), bit error rate (BER), block error rate (BLER), or packet error rate (PER), or other metrics known in the art. For example, the CQI can be obtained with respect to an OTA signal, such as an OTA signal including media content associated with a particular channel. For example, the CQI can be a metric indicating how well the OTA antenna system can receive, demodulate, and/or otherwise capture media content from the channel n with the modal antenna operating in mode m. In some embodiments, however, the CQI can be associated with media content on some or all channels of an OTA signal.

The method 800 can include, at 808, determining a weighting factor associated with the channel n and with the mode m based at least in part on the channel quality indicator associated with the channel n and with the mode m. In some embodiments, determining the weighting factor can further include storing the weighting factor in a database respective to the channel n and the mode m. For instance, the weighting factor can be determined based on the channel quality indicator and, once determined, can be stored for the channel n and/or the mode m in a database, such as a table, such that the weighting factor reflects the CQI for the channel n and mode m combination. In some embodiments, the weighting factor can be based on a relative CQI between a minimum and/or a maximum CQI for all channels and/or modes. For instance, the weighting factors may fall within a spectrum from a minimum weighting factor, such as zero, to a maximum weighting factor, such as one, with intermediate CQI values corresponding proportionally and/or otherwise to intermediate weighting factors. For example, a mode having a highest CQI for a particular channel out of all modes may be assigned a maximum weighting factor (e.g., one) and/or a mode that cannot obtain a channel may be assigned a minimum weighting factor (e.g., zero).

At 810, the method 800 can include checking that m is less than M. If m is less than M, then the method 800 can, at 811, increment m and loop back to step 804 for a next mode m+1. In this way, the method 800 can cycle through each mode of a plurality of modes for a given channel n. Additionally, at 812, the method 800 can include checking that n is les than N. if n is less than N, the method 800 can, at 813, increment n and loop back to step 802 for a next channel n+1. In this way, the method 800 can incrementally assign a weighting factor for each combination of mode and channel.

The method 800 can include, at 814, entering a standby mode (e.g., a sleep mode) until the occurrence of a detected event. In some implementations, the detected event can occur when a predetermined amount time lapses since the modal antenna was configured in a selected operating mode. Alternatively or additionally, the detected event can occur when metrics obtained indicate an amount of interference associated with the signals exceeds a threshold value. In some implementations, the detected event can occur based on a detected change in position of the antenna. In some implementations, the detected event can occur when an OTA antenna system is connected to a network access point via a removable connection. The detected event can be a user request to view a particular channel. In some implementations, the detected event can occur when user-input is received via an input device (e.g., a client device). More specifically, the input device can include one or more mechanical interface elements (e.g., push-button) in operative communication with the controller. Alternatively or additionally, the input device can include a mobile device (e.g., smartphone, tablet, laptop, etc.) that is communicatively coupled to the controller via any suitable wired or wireless communication link.

Figure 10:
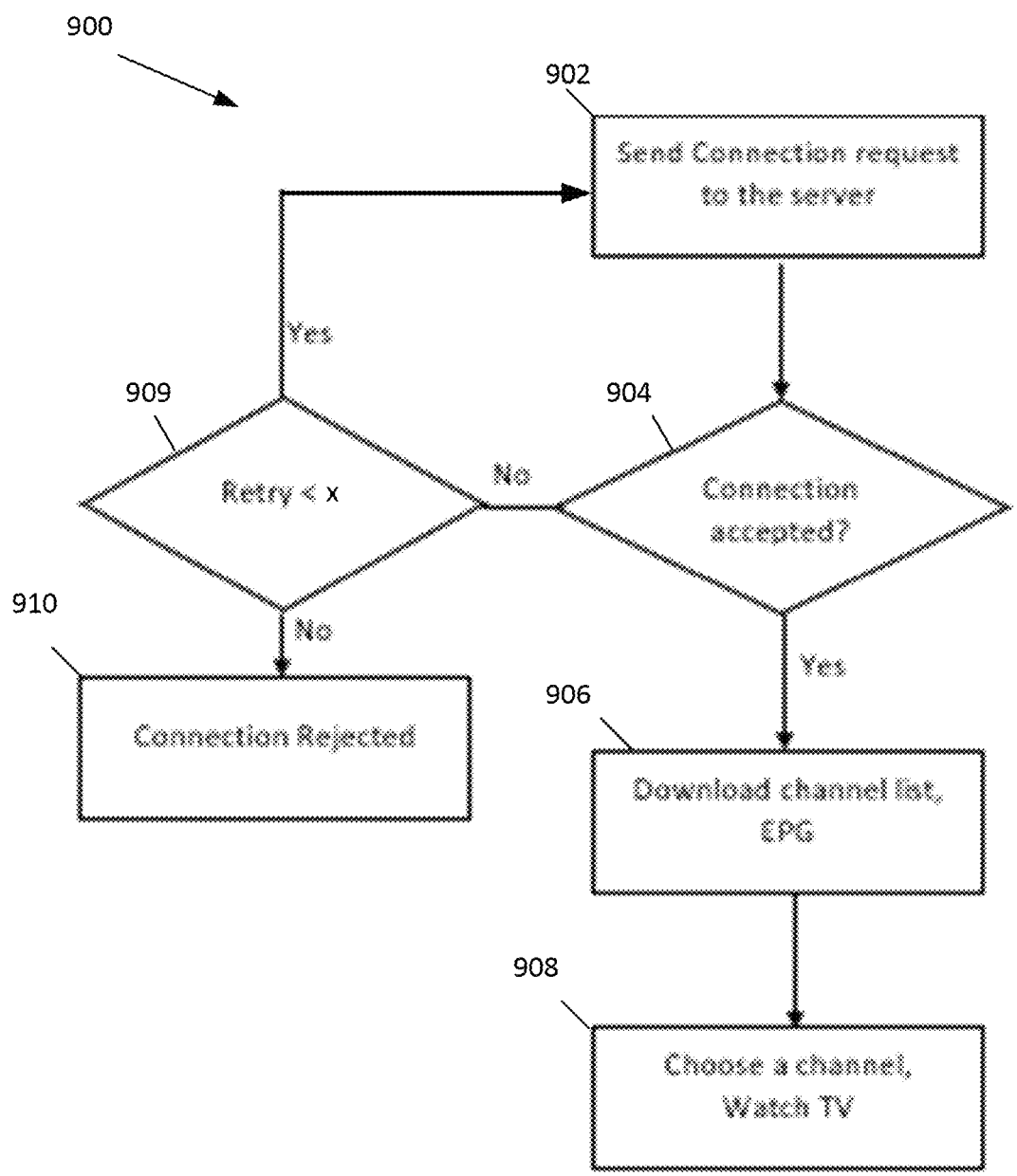
FIG. 10 depicts a flow diagram of a method for operating a client device according to example embodiments of the present disclosure.

FIG. 10 depicts a flow diagram of a method 900 for operating a client device according to example embodiments of the present disclosure. The method 900 may be implemented using, for instance, the antenna system discussed above with reference to FIG. 1 (e.g., by a client device). FIG. 10 depicts steps performed in a particular order for purposes of illustration and discussion. Those of ordinary skill in the art, using the disclosures provided herein, will understand that various steps of the method 900 may be adapted, modified, rearranged, performed simultaneously or modified in various ways without deviating from the scope of the present disclosure.

The method 900 can include, at 902, sending a connection request to a server (e.g., a network access point). For example, a client device can query a server to determine if the server has available capacity to establish a connection with the client device. As one example, the client device may send a connection request via a network link, such as a wireless network link, such as an 802.11 network link.

The method 900 can include, at 904, determining if the connection request was accepted by the server (e.g., the network access point). For instance, the server may transmit a reply message over the network link. If the connection request was accepted, the method 900 can proceed to 906, at which the client can download programming information (e.g., an electronic programming guide, channel list, channel timing, etc.). For instance, the programming information can include information on media content that is received by an OTA antenna system, such as scheduled showtimes and availability of channels. Once the programming information is established, the method 900 can include, at 908, selecting a channel and streaming media content associated with the channel. For example, a user may be provided with controls at the client device to input a user selection of a selected channel, such as by scrolling up and down on a channel list, inputting a channel number, automatically swapping to a channel at a selected time, etc.

In some embodiments, if the connection request is not accepted by the server (e.g., due to latency, lack of available computing resources, insufficient connection strength, etc.) the method 900 can include steps for retrying the connection, such as retrying a finite number of times. For instance, the method 900 can include, at 909, determining that the connection request was not accepted (e.g., due to timeout, rejection message, etc.). At 909, a client device can determine that the device has retried less than a finite number of times x. If the client devices retried less than x times, the method 900 can loop to 902 and retry. If the client device has retried x times, then the method 900 can proceed to 910, at which the connection is rejected. In some embodiments, a user of the client device may be notified that the connection was rejected (e.g., by a display screen) and/or provided with troubleshooting or diagnostic information, given the option to perform a manual retry, and/or otherwise provided with options to assist in establishing a connection.

Figure 11:
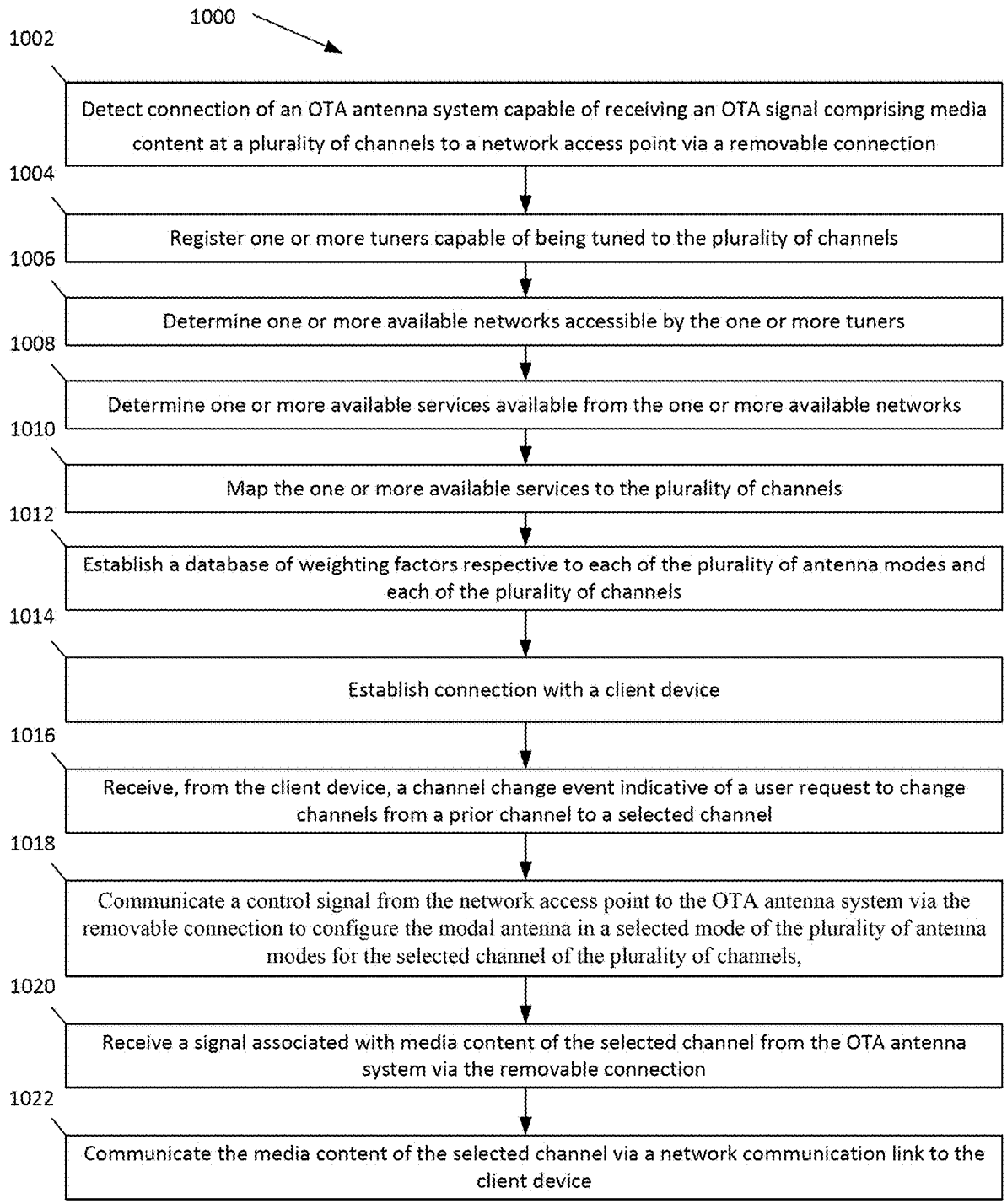
FIG. 11 depicts a flow diagram of a method for initializing a server device, such as a network access point, according to example embodiments of the present disclosure.

FIG. 11 depicts a flow diagram of a method 1000 for initializing a server device, such as a network access point, according to example embodiments of the present disclosure. The method 1000 may be implemented using, for instance, the antenna system discussed above with reference to FIG. 1 (e.g., by a client device). FIG. 11 depicts steps performed in a particular order for purposes of illustration and discussion. Those of ordinary skill in the art, using the disclosures provided herein, will understand that various steps of the method 1000 may be adapted, modified, rearranged, performed simultaneously or modified in various ways without deviating from the scope of the present disclosure.

The method 1000 can include, at 1002, detecting connection of an OTA antenna system capable of receiving an OTA signal including media content at a plurality of channels to a network access point via a removable connection. The OTA antenna system can include a modal antenna configurable in a plurality of antenna modes. Each antenna mode can be associated with a distinct radiation pattern.

For instance, the network access point can determine that the OTA antenna system has been physically connected to a USB port of the network access point. For instance, a user can insert a removable connector (e.g., USB male/female) of the OTA antenna system into a corresponding removable connector (e.g., USB female/male) at the network access point. The removable connection can provide signal transfer (e.g., data transfer) between the OTA antenna system and the network access point. For instance, in some embodiments, the removable connection can include at least one signal line and/or at least one supply (e.g., power and/or ground) line. For example, in some embodiments, the removable connection can be or can include a USB connection.

In some embodiments, the method 1000 can include, at 1004, registering one or more tuners capable of being tuned to the plurality of channels. The one or more tuners can be included within the OTA antenna system. For instance, the tuner(s) can selectively filter, demodulate, and/or otherwise isolate media content associated with selected channel(s) such that the media content can be provided for display to a user. The network access point can query the OTA antenna system to scan for tuners and/or register them at the network access point.

In some embodiments, the method 1000 can include, at 1006, determining one or more available networks accessible by the one or more tuners. For example, the OTA antenna system can receive and/or the one or more tuners can isolate signals from networks, such as television networks, such as, for example, National Television System Committee (NTSC) networks and/or Advanced Television System Committee (ATSC) networks, such as ATSC 1.0, 2.0, and/or 3.0 networks.

In some embodiments, the method 1000 can include, at 1008, determining one or more available services from the one or more available networks. For example, the available services can be or can include programming included in the media content of an OTA signal.

In some embodiments, the method 1000 can include, at 1010, mapping the one or more available services to the plurality of channels. For example, in some embodiments, each service can be mapped to a respective channel. Additionally and/or alternatively, a name of the service can be mapped to the channel. For example, the method 1000 can include combining services from a plurality of networks on a set of channels associated with the OTA system.

The method 1000 can include, at 1012, establishing a database of weighting factors respective to each of the plurality of antenna modes and each of the plurality of channels. As one example, the database of weighting factors can be established according to the method 800 of FIG. 9. For instance, establishing the database of weighting factors can include, for each channel of the plurality of channels, tuning the OTA antenna system to the channel, and for each mode of the plurality of modes, communicating a control signal from the network access point to the OTA antenna system via the removable connection to configure the modal antenna in the mode, obtaining a channel quality indicator associated with the channel and with the mode, determining a weighting factor associated with the channel and with the mode based at least in part on the channel quality indicator associated with the channel and with the mode, and storing the weighting factor in the database respective to the channel and the mode.

In some embodiments, the method 1200 can include, at 1014, establishing connection with a client device. For example, the connection with the client device can be established by a network link, such as a wireless network link, such as an 802.11 network link. One example method for establishing connection with a client is given by method 900 of FIG. 10.

In some embodiments, (e.g., prior to communicating a control signal) the method 1000 can include, at 1016, receiving, from the client device, a channel change event indicative of a user request to change channels from a prior channel to a selected channel. For instance, a user can interact with the client device (e.g., with a touch screen of the client device) to select the selected channel and/or change the selected channel from the prior channel.

The method can include, at 1018, communicating a control signal from the network access point to the OTA antenna system via the removable connection to configure the modal antenna in a selected mode of the plurality of antenna modes for a selected channel of the plurality of channels, where the selected mode is determined based at least in part on the database of weighting factors and the selected channel. The selected mode can be determined to increase communication link quality for receiving OTA content from a single channel (e.g., a single selected channel) and/or multiple channels (e.g., selected channels from multiple client devices). For instance, control signals can be communicated to a controller associated with the OTA antenna system via the USB connection. The controller can configure RF circuitry (e.g., active elements) associated with the modal antenna to configure the modal antenna in a selected mode of a plurality of antenna modes. In some embodiments, the selected mode for each channel can be computed dynamically (e.g., upon channel switch) and/or stored in and/or accessed from a lookup table.

For example, in some embodiments, the selected mode can be determined based on a database of weighting factors. The weighting factors can be respective to a mode and/or a channel, such as a mode-channel combination. Additionally and/or alternatively, the weighting factors can be respective to a mode. The selected mode can be determined based on a quality score, such as a quality score including a CQI for a mode and/or channel that is weighted based on a weighting factor respective to the mode and/or channel. An example method for determining the selected mode is given by method 1200 of FIG. 13.

The method 1000 can include, at 1020, receiving a signal associated with media content of the selected channel from the OTA antenna system via the removable connection. For example, the OTA antenna system can receive an OTA signal, then demodulate and/or otherwise isolate media content associated with the selected channel from the OTA signal. The isolated media content can then be provided through the removable connection to the network access point.

The method 1000 can include, at 1022, communicating the media content of the selected channel via a network communication link to a client device. For example, the network communication link can be a wired and/or wireless network link, such as an 802.11 network link. The media content can be communicated to the client device and subsequently displayed or otherwise utilized at the client device (e.g., to enable a user of the client device to consume the media content).

Figure 12:
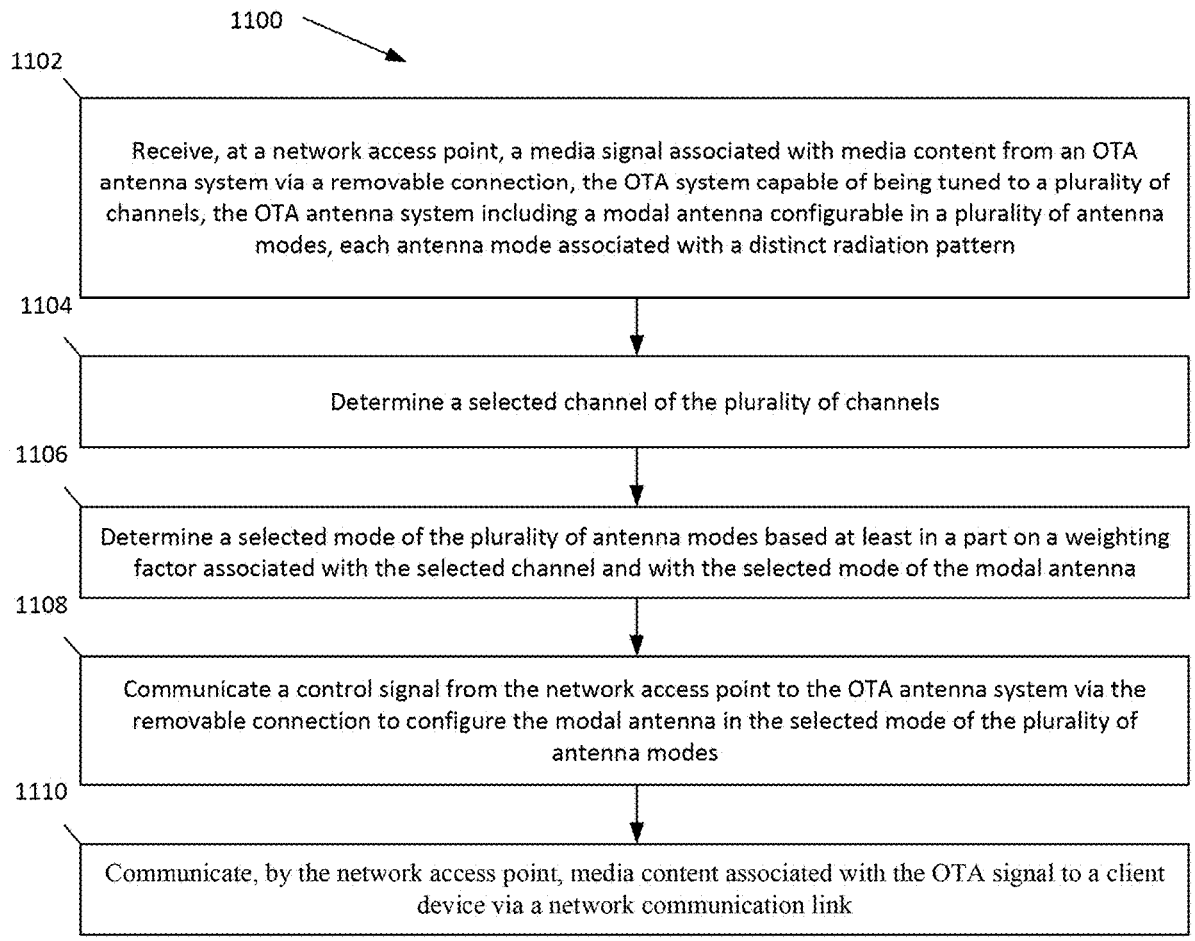
FIG. 12 depicts a flow diagram of a method for distributing over the air content according to example embodiments of the present disclosure.

FIG. 12 depicts a flow diagram of a method 1100 for distributing over the air content according to example embodiments of the present disclosure. The method 1100 may be implemented using, for instance, the antenna system discussed above with reference to FIG. 1 (e.g., by a client device). FIG. 12 depicts steps performed in a particular order for purposes of illustration and discussion. Those of ordinary skill in the art, using the disclosures provided herein, will understand that various steps of the method 1100 may be adapted, modified, rearranged, performed simultaneously or modified in various ways without deviating from the scope of the present disclosure.

The method 1100 can include, at 1102, receiving, at a network access point, a media signal associated with media content from an OTA antenna system via a removable connection. The OTA antenna system can be capable of being tuned (e.g., by a tuner) to a plurality of channels. The OTA antenna system can include a modal antenna configurable in a plurality of antenna modes, where each antenna mode associated with a distinct radiation pattern. In some embodiments, the removable connection can be or can include a universal serial bus (USB) connection.

The method 1100 can include, at 1104, determining a selected channel of the plurality of channels. For instance, in some implementations, determining a selected channel of the plurality of channels can include receiving, from a client device, a user selection of the selected channel. For instance, the user selection of the selected channel can include a channel change event indicative of a user request to change channels from a prior channel to the selected channel. As another example, the selected channel may be determined based at least in part on an automatic channel tuning (e.g., a DVR or other content recording system), a scheduled channel change, a default channel (e.g., on startup) and/or in any other suitable manner.

The method 1100 can include, at 1106, determining a selected mode of the plurality of antenna modes based at least in a part on a weighting factor associated with the selected channel and with the selected mode of the modal antenna. The selected mode can be determined to increase communication link quality for receiving OTA content from a single channel (e.g., a single selected channel) and/or multiple channels (e.g., selected channels from multiple client devices).

In some embodiments, determining a selected mode can include accessing a database of weighting factors for each of the plurality of antenna modes and for each of the plurality of channels and determining a selected mode based at least in part on the database of weighting factors. For example, the database can be established by an initial spectrum scan (e.g., by method 800 of FIG. 9). In some embodiments, determining the selected mode of the plurality of antenna modes can include determining the selected mode based at least in part on a plurality of quality scores respective to the plurality of modes. For instance, each of the plurality of quality scores can be based at least in part on a respective weighting factor of associated with a respective mode and with the selected channel. The respective weighting can be are stored in the database of weighting factors.

For instance, in some embodiments, the network access point can reconfigure a modal antenna for a new mode of operation, such as in response to a channel change event. In some embodiments, the antenna can be reconfigured according to the method 1200 of FIG. 13. For instance, in some embodiments, determining the selected mode can include tuning the OTA antenna system to the selected channel. Additionally and/or alternatively, determining the selected mode can include configuring the modal antenna in a prior mode (e.g., a mode previously used for the selected channel). In some embodiments, the prior mode can be a prior best mode, such as a prior mode having a highest weighting factor and/or CQI and/or quality score at a previous time (e.g., during establishment of the database of weighting factors). Additionally and/or alternatively, determining the selected mode can include obtaining a channel quality indicator associated with the selected channel and the prior mode. Additionally and/or alternatively, determining the selected mode can include determining a quality score associated with the prior mode based at least in part on a weighting factor associated with the selected channel and with the prior mode. The weighting factor can be stored in the database of weighting factors.

Additionally and/or alternatively, determining the selected mode can include determining that the quality score associated with the prior mode is less than a quality score associated with at least one other mode of the plurality of modes. Additionally and/or alternatively, determining the selected mode can include determining a plurality of quality scores respective to each of the plurality of modes. Additionally and/or alternatively, determining the selected mode can be based at least in part on the plurality of quality scores.

In some embodiments, subsequent to determining the selected mode, determining the selected mode can include waiting for a wait duration to elapsed. After the wait duration has elapsed, the method can include obtaining a second channel quality indicator associated with the selected channel and the selected mode and determining a second quality score associated with the selected mode based at least in part on a weighting factor associated with the selected channel and with the selected mode. For example, the method can include periodically rescanning the channel quality indicators to determine if a better mode (e.g., having a higher quality score) is available.

The method 1100 can include, at 1108, communicating a control signal from the network access point to the OTA antenna system via the removable connection to configure the modal antenna in the selected mode of the plurality of antenna modes. For instance, the method 1100 can include communicating a control signal via the USB connection to configure the modal antenna in the selected mode. For instance, control signals can be communicated to a controller associated with the OTA antenna system via the USB connection. The controller can configure RF circuitry (e.g., active elements) associated with the modal antenna to configure the modal antenna in a selected mode of a plurality of antenna modes.

The method 1100 can include, at 1110, communicating, by the network access point, media content associated with the OTA signal to a client device via a network communication link. For instance, demodulated OTA signals from the OTA antenna system can be communicated to the network access point via the removable connection. The media content can then be communicated from the network access point to one or more client devices over the communication link. The communication link can be wired and/or wireless communication link. For instance, the communication link can be an 802.11 communication link.

Figure 13:
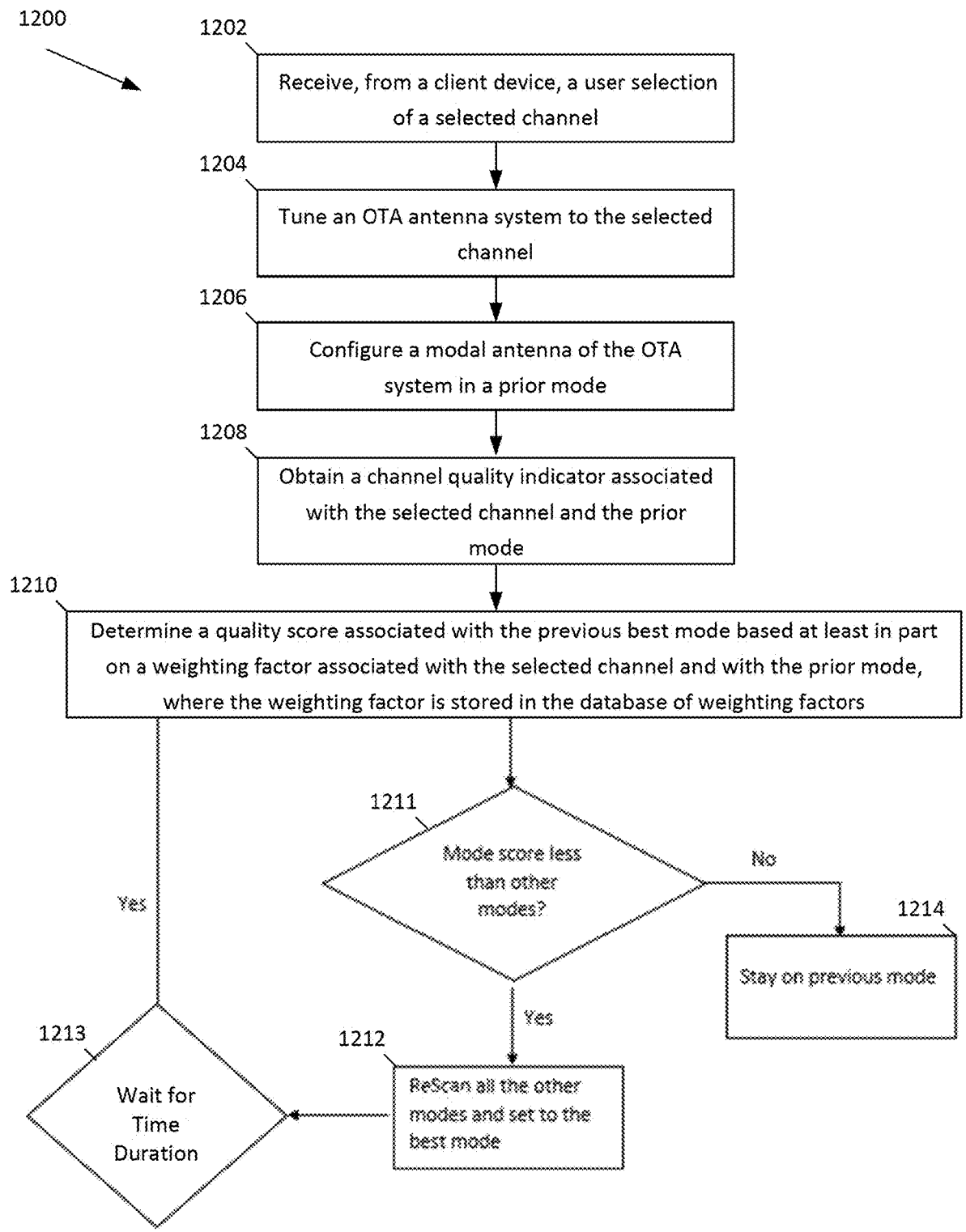
FIG. 13 depicts a flow diagram of a method for determining a selected mode (e.g., reconfiguring a modal antenna for a selected channel) according to example embodiments of the present disclosure.

FIG. 13 depicts a flow diagram of a method 1200 for determining a selected mode (e.g., reconfiguring a modal antenna for a selected channel) according to example embodiments of the present disclosure. The method 1200 may be implemented using, for instance, the antenna system discussed above with reference to FIG. 1 (e.g., by a client device). FIG. 13 depicts steps performed in a particular order for purposes of illustration and discussion. Those of ordinary skill in the art, using the disclosures provided herein, will understand that various steps of the method 1200 may be adapted, modified, rearranged, performed simultaneously or modified in various ways without deviating from the scope of the present disclosure. For example, an antenna mode can be selected to optimize a CQI and/or quality score for receiving OTA media content from a single channel. As another example, an antenna mode can be selected for receiving OTA medial content from the most channels and/or with the best (e.g., strongest) communication link quality.

For instance, the method 1200 can be implemented by a network access point. The network access point can be in signal communication with an OTA antenna system capable of receiving an OTA signal including media content at a plurality of channels via a removable connection. The OTA antenna system can include a modal antenna configurable in a plurality of antenna modes. Each antenna mode can be associated with a distinct radiation pattern.

The method 1200 can include, at 1202, receiving, from a client device, a user selection of a selected channel. For instance, a user can interact with the client device (e.g., with a touch screen of the client device) to select the selected channel. In some embodiments, the user selection of the selected channel can be or can include a channel change event indicative of a user request to change channels from a prior channel to the selected channel.

The method 1200 can include, at 1204, tuning the OTA antenna system to the selected channel. For example, a control circuit of the OTA antenna system (e.g., a tuner) can be configured to demodulate and/or otherwise selectively filter media content associated with the selected channel, such that the media content can be isolated from an overall OTC signal.

The method 1200 can include, at 1206, configuring the modal antenna in a prior mode. For example, the prior mode can be the mode associated with the prior channel. As another example, the prior mode can be a mode that has been previously determined as a best mode for the selected channel (e.g., by having and/or providing a highest weighting factor, CQI, quality score, etc.). For example, upon selecting the selected channel, the OTA antenna system can tune the modal antenna to a mode with a highest weighting factor respective to the selected channel.

The method 1200 can include, at 1208, obtaining a channel quality indicator associated with the selected channel and the prior mode. For instance, the network access point and/or the OTA antenna system can sample the OTA signal and/or the demodulated OTA signal associated with the selected channel to determine the CQI. The CQI can be a metric such as, for instance, a channel quality indicator (CQI), such as, for example, receive power (RP), signal to noise ratio (SNR), signal-to-interference-plus-noise ratio (SINR), magnitude error ratio (MER), error vector magnitude (EVM), bit error rate (BER), block error rate (BLER), or packet error rate (PER), or other metrics known in the art.

The method 1200 can include, at 1210, a quality score associated with the prior mode based at least in part on a weighting factor associated with the selected channel and with the prior mode. The weighting factor can be stored in a database of weighting factors. For example, in some embodiments, the quality score can be a CQI that is scaled (e.g., multiplicatively scaled) by the weighting factor.

At 1211, the method 1200 can include determining whether or not the quality score associated with the prior mode is less than a quality score associated with at least one other mode of the plurality of modes. For example, if the prior mode and/or currently configured mode is determined to have the highest quality score, the method 1200 can proceed to 1214, at which the antenna stays at the current mode for streaming OTA content. If, however, it is determined the quality score associated with the prior mode is less than a quality score associated with at least one other mode of the plurality of modes, the method 1200 can proceed to 1212.

The method 1200 can include, at 1212, scanning each mode and setting the modal antenna to the best mode (e.g., providing a strongest channel quality) of the scanned modes. For instance, the method 1200 can include determining a plurality of quality scores respective to each of the plurality of modes and determining the selected mode based at least in part on the plurality of quality scores. For example, for each antenna mode, the modal antenna can be configured in the antenna mode and a CQI can be obtained (e.g., for the selected channel) with the antenna configured in the antenna mode. Furthermore, quality scores can be computed from the CQIs (e.g., scaled by the weighting factor) and the mode with the highest quality score can be selected as the selected mode.

Furthermore, in some embodiments, the method 1200 can include, subsequent to determining the selected mode, at 1213, waiting for a wait duration to elapse. For instance, the wait duration can represent a periodic sampling time. After the wait duration has elapsed, the method 1200 can loop back to step 1210. For instance, the method 1200 can loop back and include obtaining a second channel quality indicator associated with the selected channel and the selected mode and determining a second quality score associated with the selected mode based at least in part on a weighting factor associated with the selected channel and with the selected mode. The method 1200 can then repeat steps 1211 through 1214, with the second CQI and second quality score acting as the CQI and/or quality score associated with the prior mode. Thus, the method 1200 can be periodically repeated until eventually settling on a best mode (e.g., a mode providing a strongest channel quality, highest quality score, etc.) at 1214.

Figure 14:
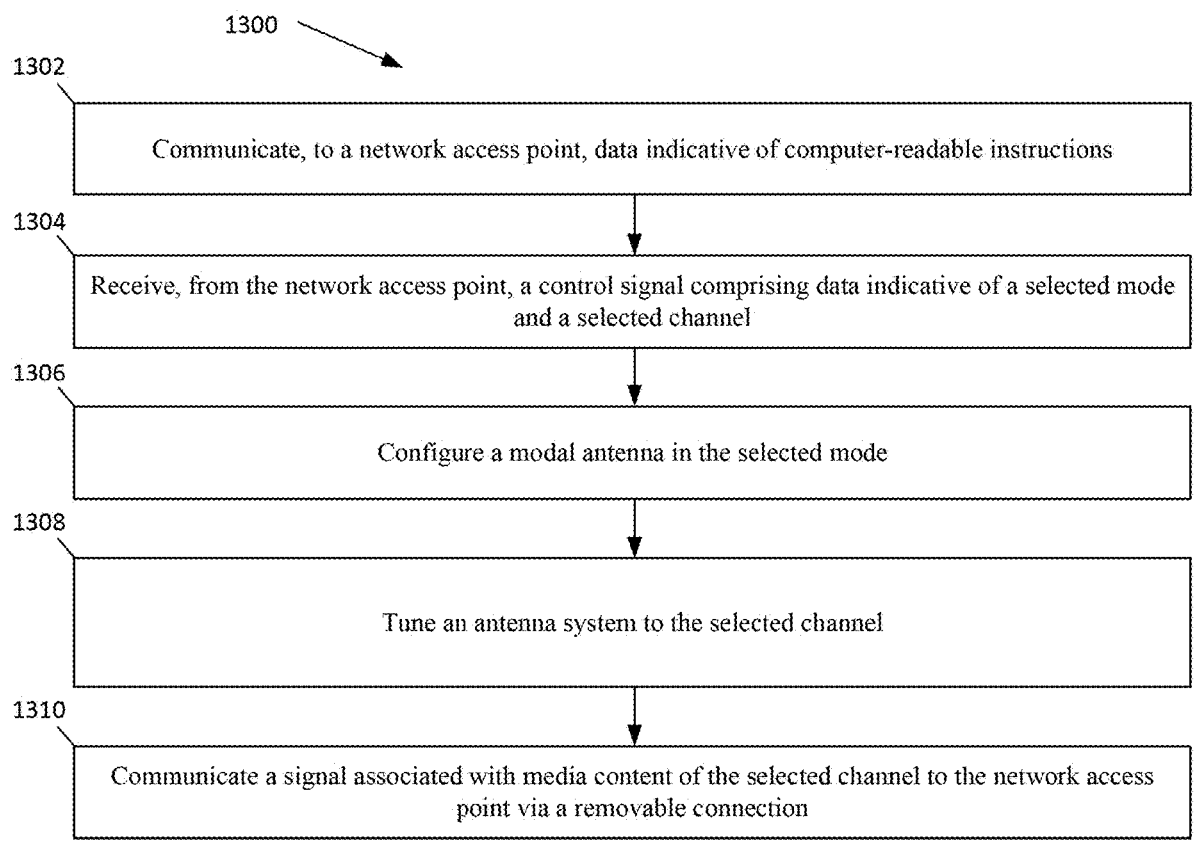
FIG. 14 depicts a flow diagram of a method for operating an OTA antenna system according to example embodiments of the present disclosure.

FIG. 14 depicts a flow diagram of a method 1300 for operating an OTA antenna system according to example embodiments of the present disclosure. The method 1300 may be implemented using, for instance, the antenna system discussed above with reference to FIG. 1 (e.g., by a client device). FIG. 14 depicts steps performed in a particular order for purposes of illustration and discussion. Those of ordinary skill in the art, using the disclosures provided herein, will understand that various steps of the method 1300 may be adapted, modified, rearranged, performed simultaneously or modified in various ways without deviating from the scope of the present disclosure.

For instance, the method 1300 can be implemented by an OTA antenna system including a modal antenna configurable in a plurality of antenna modes, where each of the plurality of antenna modes forms a distinct radiation pattern (e.g., radiation patterns that rotate and/or form distinct two- and/or three-dimensional profiles). The OTA antenna system (e.g., the modal antenna) can be configured to receive an OTA signal including media content associated with a plurality of channels. For instance, the OTA antenna system can include a control circuit configured to tune the antenna system to one of a plurality of channels. The OTA antenna system can be placed in electrical (e.g., signal) communication with a network access point by a removable connection, such as a USB connection. For instance, the OTA antenna system can include a connector configured to form a removable connection and receive and transmit signals through the removable connection. The OTA antenna system can include one or more non-transitory memory devices storing computer-readable instructions that, when implemented by one or more processors of a network access point to which the antenna system is connected by the removable connection, cause the antenna system to perform operations of at least the method 1300.

The method 1300 can include, at 1302, communicating, to a network access point, data indicative of computer-readable instructions. For instance, in some embodiments, some or all of the methods described herein (e.g., methods 700, 800, 900, 1000, 1100, 1200, 1300), can include obtaining (e.g., downloading) instructions (e.g., software) associated with operation of the OTA antenna system via the USB connection. For instance, instructions for configuring and/or controlling the OTA antenna system via the network access point can be downloaded and stored in a memory at the network access point.

The instructions can include detecting connection of the antenna system to the network access point via the removable connection. Additionally and/or alternatively, the instructions can include establishing a database of weighting factors respective to each of the plurality of antenna modes and each of the plurality of channels. Additionally and/or alternatively, the instructions can include communicating a control signal from the network access point to the OTA antenna system via the removable connection to configure the modal antenna in a selected mode of the plurality of antenna modes for a selected channel of the plurality of channels, where the selected mode can be determined based at least in part on the database of weighting factors and the selected channel. Additionally and/or alternatively, the instructions can include receiving a signal associated with media content of the selected channel from the OTA antenna system via the removable connection. Additionally and/or alternatively, the instructions can include communicating the media content of the selected channel via a network communication link to one or more client devices.

In some embodiments, the data indicative of computer-readable instructions for establishing the database of weighting factors comprises data indicative of computer-readable instructions including, for each channel of the plurality of channels, tuning the antenna system to the channel. Furthermore, the instructions can include, for each mode of the plurality of modes, communicating a control signal from the network access point to the antenna system via the removable connection to configure the modal antenna in the mode, obtaining a channel quality indicator associated with the channel and with the mode, and determining a weighting factor associated with the channel and with the mode based at least in part on the channel quality indicator associated with the channel and with the mode. Furthermore, the instructions can include storing the weighting factor in the database respective to the channel and the mode.

Additionally and/or alternatively, in some embodiments, the data indicative of computer-readable instructions can further including data indicative of computer-readable instructions for determining a selected channel of the plurality of channels and determining a selected mode of the plurality of antenna modes based at least in a part on a weighting factor associated with the selected channel and with the selected mode of the modal antenna. For instance, the instructions for determining the selected mode can include tuning the OTA antenna system to the selected channel, configuring the modal antenna in a prior mode, obtaining a channel quality indicator associated with the selected channel and the prior mode, determining a quality score associated with the prior mode based at least in part on a weighting factor associated with the selected channel and with the prior mode, where the weighting factor is stored in the database of weighting factors, determining that the quality score associated with the prior mode is less than a quality score associated with at least one other mode of the plurality of modes, determining a plurality of quality scores respective to each of the plurality of modes, and/or determining the selected mode based at least in part on the plurality of quality scores.

Subsequent to communicating the data indicative of instructions (e.g., after the software of the instructions is installed at the network access point), the method 1300 can include, at 1304, receiving, from the network access point, the control signal. The control signal can include data indicative of the selected mode and the selected channel. For example, the control signal can be produced by the network access point in accordance with the instructions transmitted by the OTA antenna system. The control signal can include a selected channel (e.g., from a user) and/or a selected mode that provides improved performance for the selected channel.

The method 1300 can include, at 1306, configuring the modal antenna in the selected mode. For example, the modal antenna can be configured in the selected mode by a control circuit, such as RF circuitry, etc. In some embodiments, the modal antenna can be configured by providing electrical characteristics (e.g., reactances) corresponding to the selected mode at one or more radiating elements and/or one or more parasitic elements of the modal antenna.

The method 1300 can include, at 1308, tuning the antenna system to the selected channel. For instance, the antenna system can be tuned by the selected channel by a control circuit, such as a tuner. For example, in some embodiments, the network access point can send commands via the USB connection to the OTA antenna system to control the tuner to tune the OTA antenna system to receive and demodulate signals associated with the selected channel. As another example, the network access point can send the selected channel and the tuner can tune the OTA antenna system according to the selected channel.

The method 1300 can include, at 1310, communicating the signal associated with media content of the selected channel to the network access point via the removable connection. For instance, demodulated OTA signals from the OTA antenna system can be communicated to the network access point via the removable (e.g., USB) connection. The signals can then be provided to one or more client devices from the network access point.

In some implementations, the quality score $S_n$ for each of the modes (e.g., Modes 1 through M) can be determined as shown in Equation 1:

$$S_{m,n} = w_{m,n} * CQI_{m,n} \qquad \text{Equation 1}$$

In the above formula, $w_{m,n}$ corresponds to the weighting factor assigned to channels 1 through N and/or modes 1 through M. Additionally, $CQI_{m,n}$ corresponds to the channel quality indicator for a given channel n and mode m. In some implementations, the selected mode of operation for the modal antenna can correspond to the mode having the highest quality score for a given channel n $S_{m,n}$. More specifically, the selected mode $m_{selected}$ can be determined as shown below in Equation 3:

$$m_{selected} = \arg\max_m(S_{m,n}) \qquad \text{Equation 2}$$

Figure 15:
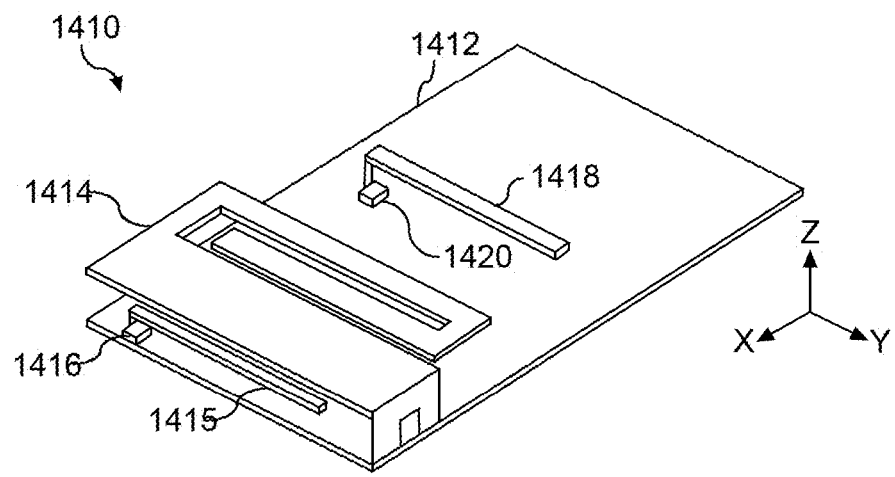
FIG. 15 illustrates an example embodiment of a modal antenna that can be used, for instance, with a network access point and/or one or more client devices in accordance with aspects of the present disclosure.

FIG. 15 illustrates an example embodiment of a modal antenna 1410 that can be used, for instance, with a network access point and/or one or more client devices in accordance with aspects of the present disclosure. The modal antenna 1410 may include a circuit board 1412 (e.g., including a ground plane) and a driven antenna element 1414 disposed on the circuit board 1412. An antenna volume may be defined between the circuit board (e.g., and the ground plane) and the driven antenna element.

In some embodiments, a first parasitic element 1415 may be positioned at least partially within the antenna volume. A first active element 1416 may be coupled with the parasitic element 1415. The first active element 1416 can be a passive or active component or series of components and may be configured to alter a reactance on the first parasitic element 1415 either by way of a variable reactance, or shorting to ground, resulting in a frequency shift of the antenna.

In some embodiments, a second parasitic element 1418 may be disposed proximate the circuit board 1412 and may be positioned outside of the antenna volume. The second parasitic element 1418 may further include a second active element 1420 which may individually include one or more active and/or passive components. The second active element 1420 can be a passive or active component or series of components and may be configured to alter a reactance on the second parasitic element 1418 either by way of a variable reactance or shorting to ground, resulting in a frequency shift of the antenna. The second parasitic element 1418 may be positioned adjacent the driven element 1414 and may also be positioned outside of the antenna volume.

The described configuration may provide an ability to shift the radiation pattern characteristics of the driven antenna element by varying a reactance thereon. Shifting the antenna radiation pattern can be referred to as "beam steering". In instances where the antenna radiation pattern comprises a null, a similar operation can be referred to as "null steering" since the null can be shifted to an alternative position about the antenna (e.g., to reduce interference). In some embodiments, the second active element 1420 may include a switch for connecting the second parasitic to ground when "On" and for terminating the short when "Off". It should however be noted that a variable reactance on either of the first or second parasitic elements, for example by using a variable capacitor or other tunable component, may further provide a variable shifting of the antenna pattern or the frequency response. For example, the first active element 716 and/or second active element 1420 may include at least one of a tunable capacitor, MEMS device, tunable inductor, switch, a tunable phase shifter, a field-effect transistor, or a diode.

Figure 16:
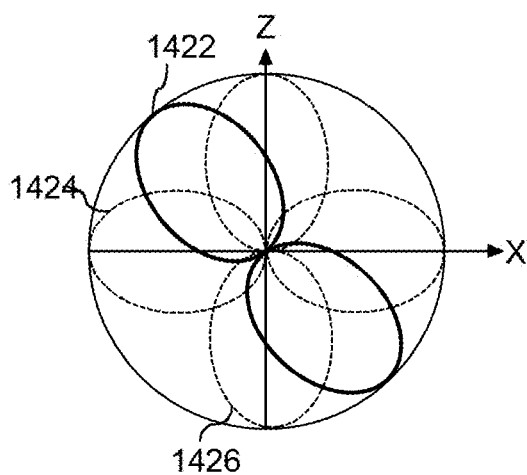
FIG. 16 illustrates a two-dimensional antenna radiation pattern associated with the modal antenna of FIG. 15.

FIG. 16 illustrates a two-dimensional antenna radiation pattern associated with the modal antenna of FIG. 15. The radiation pattern may be shifted by controlling an electrical characteristic associated with at least one of the first and/or second parasitic elements 1415, 1418 of the modal antenna 1410. For example, in some embodiments, the radiation pattern may be shifted from a first mode 1422 to a second mode 1424, or a third mode 1426 and so forth.

Figure 17:
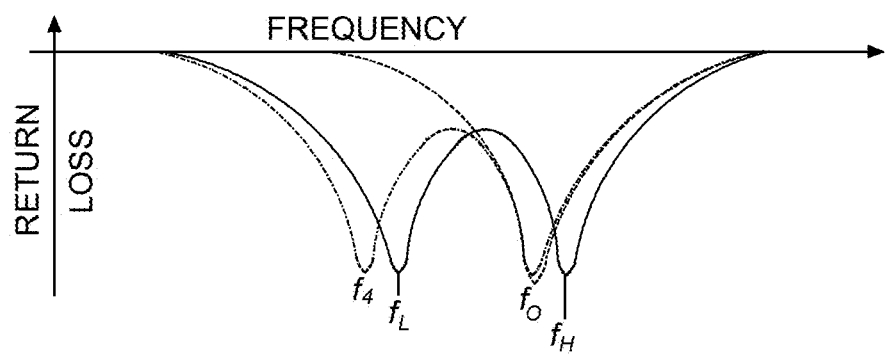
FIG. 17 illustrates an example frequency plot of the modal antenna of FIG. 15 according to example aspects of the present disclosure.

FIG. 17 illustrates an example frequency plot of the modal antenna of FIG. 15 according to example aspects of the present disclosure. The frequency of the antenna can be shifted by controlling an electrical characteristic associated with at least one of the first and/or second parasitic elements 1415, 1418 of the modal antenna 1410. For example, a first frequency ($f_0$) of the antenna may be achieved when the first and second parasitic elements are switched "Off"; the frequencies ($f_L$) and ($f_H$) may be produced when the second parasitic is shorted to ground; and the frequencies ($f_4$; $f_0$) may be produced when the first and second parasitic elements are each shorted to ground. It should be understood that other configurations are possible within the scope of this disclosure. For example, more or fewer parasitic elements may be employed. The positioning of the parasitic elements may be altered to achieve additional modes that may exhibit different frequencies and/or combinations of frequencies.

FIGS. 14-16 depict one example modal antenna having a plurality of modes for purposes of illustration and discussion. Those of ordinary skill in the art, using the disclosures provided herein, will understand that other modal antennas and/or antenna configurations can be used without deviating from the scope of the present disclosure.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for distributing over the air (OTA) content, the method comprising:
   detecting physical connection of an OTA antenna system capable of receiving an OTA signal comprising media content at a plurality of channels to a network access point via a removable connection, the OTA antenna system comprising a modal antenna configurable in a plurality of antenna modes, each antenna mode associated with a distinct radiation pattern;
   subsequent to detecting connection, establishing a database of weighting factors respective to each of the plurality of antenna modes and to each of the plurality of channels;
   communicating a control signal from the network access point to the OTA antenna system via the removable connection to configure the modal antenna in a selected antenna mode of the plurality of antenna modes for a selected channel of the plurality of channels, the selected mode determined based at least in part on the database of weighting factors;
   receiving a signal associated with media content of the selected channel from the OTA antenna system via the removable connection; and
   communicating the media content of the selected channel via a network communication link to a client device.

2. The method of claim 1, wherein establishing the database of weighting factors comprises, for each channel of the plurality of channels:
   tuning the OTA antenna system to the channel;
   for each antenna mode of the plurality of antenna modes:
      communicating a control signal from the network access point to the OTA antenna system via the removable connection to configure the modal antenna in the antenna mode;
      obtaining a channel quality indicator associated with the channel and with the antenna mode;
      determining a weighting factor associated with the channel and with the antenna mode based at least in part on the channel quality indicator associated with the channel and with the antenna mode; and
      storing the weighting factor in the database respective to the channel and the antenna mode.

3. The method of claim 1, further comprising:
   registering one or more tuners capable of being tuned to the plurality of channels,
   determining one or more available networks accessible by the one or more tuners;
   determining one or more available services from the one or more available networks; and
   mapping the one or more available services to the plurality of channels.

4. The method of claim 1, further comprising, prior to communicating the control signal, receiving, from the client device, a channel change event indicative of a user request to change channels from a prior channel to the selected channel.

5. The method of claim 1, wherein the removable connection comprises a universal serial bus (USB) connection.

6. The method of claim 1, wherein the network communication link comprises an 802.11 network communication link.

7. The method of claim 1, wherein the selected mode of the plurality of antenna modes is determined to increase communication link quality for receiving media content from more than one channel of the plurality of channels.

8. A method for distributing over the air (OTA) content over a network, comprising:
   receiving, at a network access point, a media signal associated with media content from an OTA antenna system via a removable connection, the OTA antenna system capable of being tuned to a plurality of channels, the OTA antenna system comprising a modal antenna configurable in a plurality of antenna modes, each antenna mode associated with a distinct radiation pattern;
   determining a selected channel of the plurality of channels;
   accessing a database of weighting factors for each of the plurality of antenna modes and for each of the plurality of channels;
   determining a selected mode of the plurality of antenna modes based at least in a part on a weighting factor associated with the selected channel and with the selected mode of the modal antenna, the weighting factor stored in the database of weighting factors;
   communicating a control signal from the network access point to the OTA antenna system via the removable connection to configure the modal antenna in the selected mode of the plurality of antenna modes; and
   communicating, by the network access point, media content associated with the OTA signal to a client device via a network communication link.

9. The method of claim 8, wherein determining the selected mode of the plurality of antenna modes comprises determining the selected mode based at least in part on a plurality of quality scores respective to the plurality of antenna modes, each of the plurality of quality scores based at least in part on a respective weighting factor of associated with a respective mode and with the selected channel, wherein the respective weighting factors are stored in the database of weighting factors.

10. The method of claim 9, wherein determining the selected mode comprises:
tuning the OTA antenna system to the selected channel;
configuring the modal antenna in a prior mode;
obtaining a channel quality indicator associated with the selected channel and the prior mode; and
determining a quality score associated with the prior mode based at least in part on a weighting factor associated with the selected channel and with the prior mode, the weighting factor stored in the database of weighting factors.

11. The method of claim 10, further comprising:
determining that the quality score associated with the prior mode is less than a quality score associated with at least one other antenna mode of the plurality of antenna modes;
determining a plurality of quality scores respective to each of the plurality of antenna modes; and
determining the selected mode based at least in part on the plurality of quality scores.

12. The method of claim 11, further comprising:
subsequent to determining the selected mode, waiting for a wait duration to elapse;
after the wait duration has elapsed, obtaining a second channel quality indicator associated with the selected channel and the selected mode; and
determining a second quality score associated with the selected mode based at least in part on a weighting factor associated with the selected channel and with the selected mode.

13. The method of claim 8, wherein determining a selected channel of the plurality of channels comprises receiving, from the client device, a user selection of the selected channel.

14. The method of claim 13, wherein the user selection of the selected channel comprises a channel change event indicative of a user request to change channels from a prior channel to the selected channel.

15. The method of any of claim 8, wherein the removable connection comprises a universal serial bus (USB) connection.

16. The method of any of claim 8, wherein the network communication link comprises an 802.11 network communication link.

17. An antenna system for use in distributing over the air (OTA) content, the antenna system comprising:
a modal antenna configurable in a plurality of antenna modes, each antenna mode associated with a distinct radiation pattern, the modal antenna configured to receive an OTA signal associated with media content;
a control circuit configured to tune the antenna system to one of a plurality of channels;
a connector configured to form a removable connection and receive and transmit signals through the removable connection; and
one or more non-transitory memory devices storing computer-readable instructions that, when implemented by one or more processors of a network access point to which the antenna system is connected by the removable connection, cause the antenna system to perform operations comprising:
communicating, to the network access point, data indicative of computer-readable instructions comprising:
detecting physical connection of the antenna system to the network access point via the removable connection;
subsequent to detecting connection, establishing a database of weighting factors respective to each of the plurality of antenna modes and each of the plurality of channels;
communicating a control signal from the network access point to the OTA antenna system via the removable connection to configure the modal antenna in a selected mode of the plurality of antenna modes for a selected channel of the plurality of channels, the selected mode determined based at least in part on the database of weighting factors and the selected channel;
receiving a signal associated with media content of the selected channel from the OTA antenna system via the removable connection; and
communicating the media content of the selected channel via a network communication link to one or more client devices;
subsequent to communicating the data indicative of instructions, receiving, from the network access point, the control signal, the control signal comprising data indicative of the selected mode and the selected channel;
configuring the modal antenna in the selected mode;
tuning the antenna system to the selected channel; and
communicating the signal associated with media content of the selected channel to the network access point via the removable connection.

18. The antenna system of claim 17, wherein the data indicative of computer-readable instructions comprising establishing the database of weighting factors comprises data indicative of computer-readable instructions comprising, for each channel of the plurality of channels:
tuning the antenna system to the channel;
for each antenna mode of the plurality of antenna modes:
communicating a control signal from the network access point to the antenna system via the removable connection to configure the modal antenna in the antenna mode;
obtaining a channel quality indicator associated with the channel and with the antenna mode; and
determining a weighting factor associated with the channel and with the antenna mode based at least in part on the channel quality indicator associated with the channel and with the antenna mode; and
storing the weighting factor in the database respective to the channel and the antenna mode.

19. The antenna system of claim 17, wherein the data indicative of computer-readable instructions further comprises data indicative of computer-readable instructions comprising:
determining a selected channel of the plurality of channels; and
determining a selected mode of the plurality of antenna modes based at least in a part on a weighting factor associated with the selected channel and with the selected mode of the modal antenna, wherein determining the selected mode comprises:
tuning the antenna system to the selected channel;
configuring the modal antenna in a prior mode;
obtaining a channel quality indicator associated with the selected channel and the prior mode;
determining a quality score associated with the prior mode based at least in part on a weighting factor associated with the selected channel and with the prior mode, the weighting factor stored in the database of weighting factors;

determining that the quality score associated with the prior mode is less than a quality score associated with at least one other antenna mode of the plurality of antenna modes;
determining a plurality of quality scores respective to each of the plurality of antenna modes; and
determining the selected mode based at least in part on the plurality of quality scores.

20. The antenna system of any of claim 17, wherein the removable connection comprises a universal serial bus (USB) connection.

\* \* \* \* \*